(12) United States Patent
Jensen et al.

(10) Patent No.: US 11,931,664 B2
(45) Date of Patent: Mar. 19, 2024

(54) USER EXPERIENCES IN SIMULATED ENVIRONMENTS

(71) Applicants: James Jensen, American Fork, UT (US); W. Matthew Hall, Provo, UT (US)

(72) Inventors: James Jensen, American Fork, UT (US); W. Matthew Hall, Provo, UT (US)

(73) Assignee: LIMITLESS FLIGHT, INC., American Fork, UT (US)

(*) Notice: Subject to any disclaimer, the term of this patent is extended or adjusted under 35 U.S.C. 154(b) by 817 days.

(21) Appl. No.: 16/987,364

(22) Filed: Aug. 6, 2020

(65) Prior Publication Data
US 2021/0228993 A1 Jul. 29, 2021

Related U.S. Application Data

(60) Provisional application No. 62/883,546, filed on Aug. 6, 2019.

(51) Int. Cl.
| A63G 31/16 | (2006.01) |
| A63G 31/02 | (2006.01) |
| B66D 1/46 | (2006.01) |
| G05B 15/02 | (2006.01) |
| A63G 31/00 | (2006.01) |

(52) U.S. Cl.
CPC ............. *A63G 31/16* (2013.01); *A63G 31/02* (2013.01); *B66D 1/46* (2013.01); *G05B 15/02* (2013.01); *A63G 2031/002* (2013.01); *B66D 2700/0183* (2013.01)

(58) Field of Classification Search
CPC .......... A63G 31/16; A63G 31/02; B66D 1/46; B66D 2700/0183
USPC ..................................................... 700/275
See application file for complete search history.

(56) References Cited

U.S. PATENT DOCUMENTS

| 2004/0206715 A1* | 10/2004 | Rodnunsky | ............. B66C 21/04 |
| | | | 212/76 |
| 2019/0219476 A1 | 7/2019 | Romanenko et al. | |
| 2023/0029823 A1* | 2/2023 | Bettinger | ................ G06F 3/011 |

FOREIGN PATENT DOCUMENTS

| CN | 105460223 A | * | 4/2016 | |
| CN | 106218900 A | * | 12/2016 | ............. B64D 23/00 |
| CN | 110782732 A | * | 2/2020 | ............. G09B 9/003 |
| CN | 113813598 A | * | 12/2021 | |
| KR | 101212445 | | 12/2012 | |
| KR | 20170048944 A | * | 5/2017 | |
| KR | 20180077519 A | * | 7/2018 | |
| KR | 20180094308 | | 8/2018 | |
| KR | 20190057622 | | 5/2019 | |
| KR | 102328405 B1 | * | 11/2021 | |
| RU | 2646324 | | 3/2018 | |

(Continued)

*Primary Examiner* — Ronald D Hartman, Jr.
(74) *Attorney, Agent, or Firm* — Jacob Ong

(57) ABSTRACT

A simulated environment includes a motion control system. The motion control system comprises a suspension structure, a housing slidably engaged to the suspension structure such that the suspension controller translates in a planar manner relative to the suspension structure. A rotary component is rotatably attached to the housing. A plurality of winches are attached to the rotary component, the plurality of winches having cables to allow longitudinal movement of the cables parallel to a force of gravity.

13 Claims, 19 Drawing Sheets

(56) References Cited

FOREIGN PATENT DOCUMENTS

RU          2713681 C1 * 2/2020
SE          1650199 A1 * 8/2017

* cited by examiner

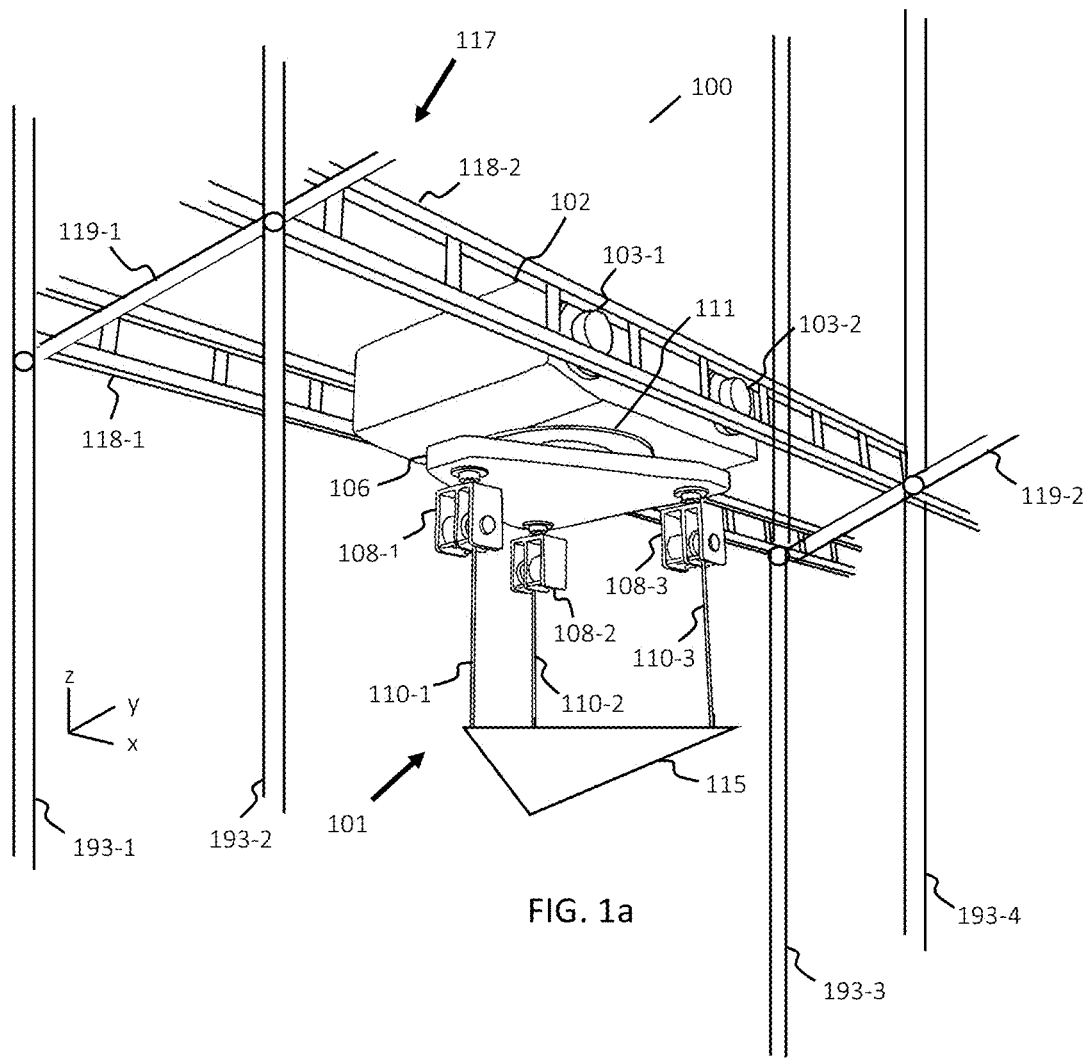
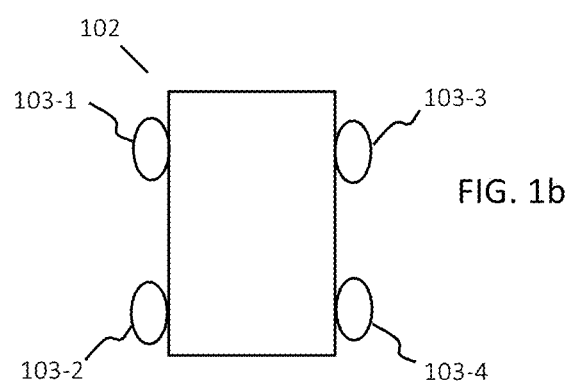
FIG. 1a
FIG. 1b

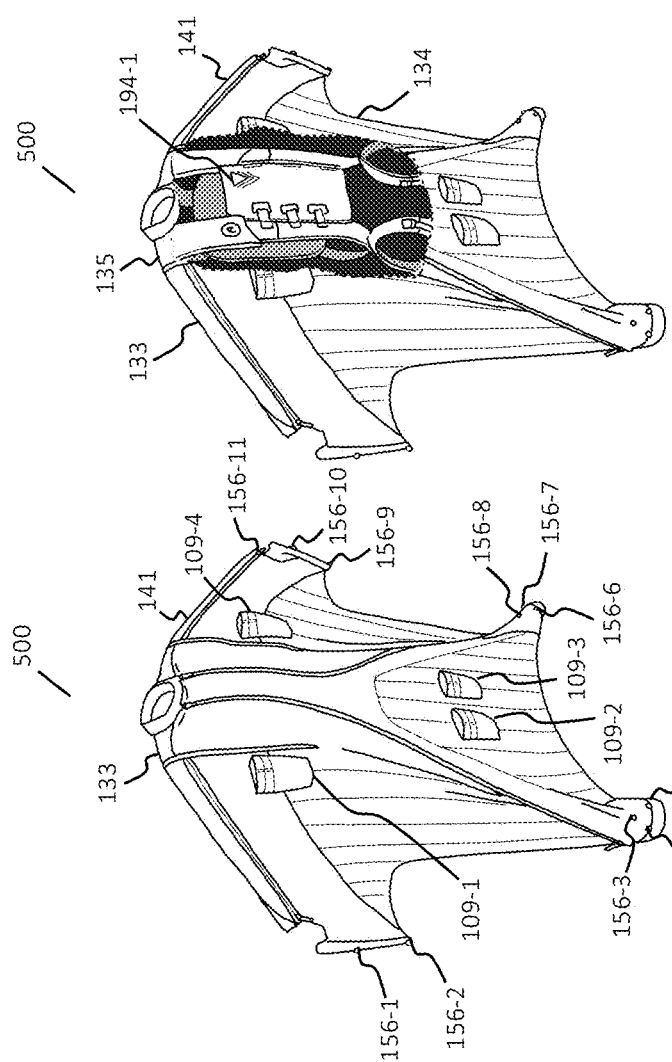

USER EXPERIENCES IN SIMULATED ENVIRONMENTS

BACKGROUND

A user can have experiences in simulated environments that allow the person to experience movements without having to be in the actual environment. This allows for high adventure experiences, such as base jumping, flying, and falling simulations, for example.

BRIEF DESCRIPTION OF THE DRAWINGS

The accompanying drawings illustrate various implementations of the principles described herein and are a part of the specification. The illustrated implementations are merely examples and do not limit the scope of the claims.

FIG. 1a illustrates a perspective view of a motion control system according to an example of the principles described herein.

FIG. 1b illustrates a top view of a housing according to an example of the principles described herein.

FIG. 4a illustrates a perspective view of a suit system according to an example of the principles described herein.

FIG. 4b illustrates a perspective cutout view of a suit system according to an example of the principles described herein.

FIG. 4c illustrates a perspective view of a suit system according to an example of the principles described herein.

DETAILED DESCRIPTION

Figure 2:
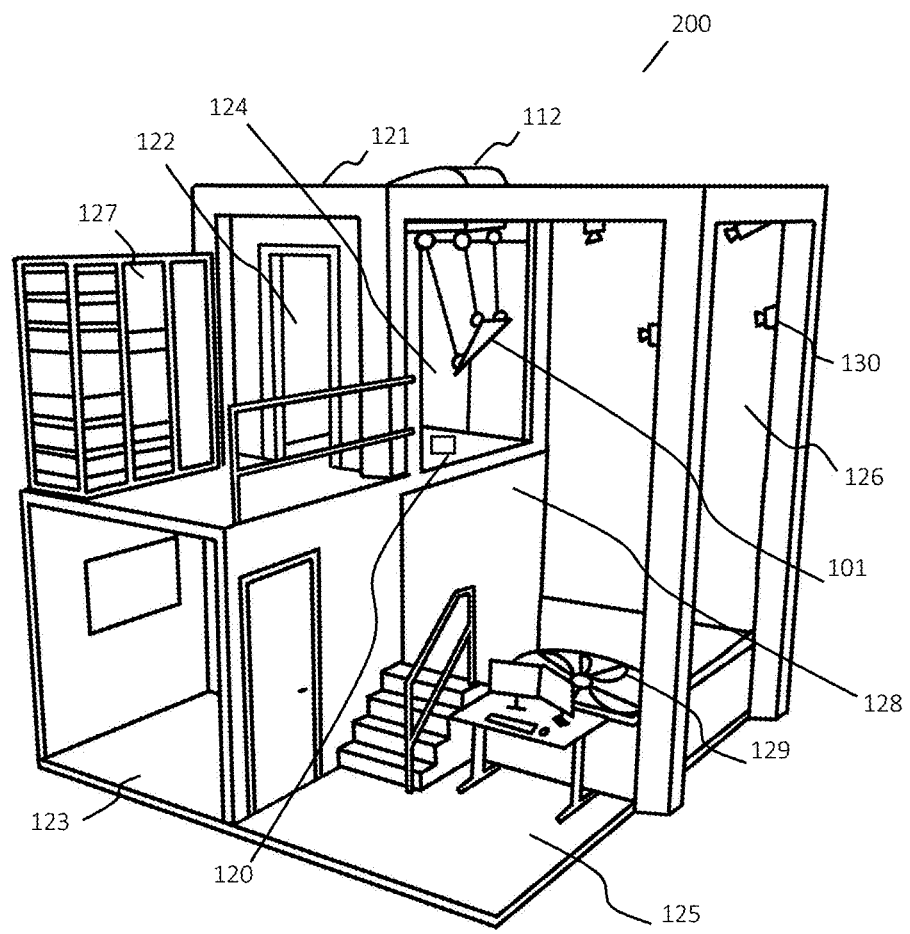
FIG. 2 illustrates a perspective view of a motion control environment according to an example of the principles described herein.

In the following description, for purposes of explanation, specific details are set forth in order to provide a thorough understanding of the disclosure. It will be apparent, however, to one skilled in the art that examples consistent with the present disclosure may be practiced without these specific details. Reference in the specification to "an example" or similar language means that a particular feature, structure, or characteristic described in connection with the implementation or example is included in at least that one implementation, but not necessarily in other implementations. The various instances of the phrase "in one implementation" or similar phrases in various places in the specification are not necessarily all referring to the same implementation.

The preceding description has been presented only to illustrate and describe examples of the principles described. This description is not intended to be exhaustive or to limit these principles to any precise form disclosed. Many modifications and variations are possible in light of the above teaching.

A "simulated environment", as used herein, is one that provides computer-generated visual images, atmospheric inputs, and physical conditions to at least one user.

Computer-generated images result from computer graphics that produce images that may be still, animated, static, dynamic, two-dimensional, and three-dimensional. The simulated environment may be interactive in that the user's involvement, whether it be through verbal communication, hand gestures, tactile surfaces, or other sensory action, causes an effect in the simulated environment in which the user feels a response or at least a portion of the computer-generated image is effected in response.

Atmospheric inputs to the user may include inputs that are akin to natural elements such as wind, moisture, or heat. The inputs allow the user to experience a situation or place, and also experience the elements associated with that situation or place. The inputs may further help the user to respond to situations in a game-like setting, for example, a tennis match in which the input of a tennis racquet and movement of the tennis racquet is key to hitting the ball. In another example, the input helps the user to more fully engage and conquer a high adventure such as rock climbing, in which the input of rocky surfaces help the user to find rocky landmarks.

Such inputs may further include control of the body of the user and physical conditions of the user. By controlling the body location within the actual environment and the body limb positions within the actual environment, the user can be more fully guided and immersed in a simulated situation. For example, a simulation of a user jumping off of a cliff may include that the user is actually jumping from a three-foot height. However, by giving the user a lip of a cliff to jump off of physically along with a visual display of the lip of a cliff, and wind patterns that can be felt on top of a cliff, enables the user to feel as if the cliff is real. When the user jumps off the cliff, there is nothing below the user as the user seemingly falls while actually being suspended by cables.

A "simulated experience", as used herein, is the idea of the user believing, based on the inputs, that the user is doing something that is not actually being done, Particularly, the physical, visual, auditory, tactile inputs, etc., lead the user to believe they are in another place. For example, the user will not actually be aerodynamically lifted into outer space or fly in the Pyrenees mountains, but instead will actually remain in a 12"×24" room. By strapping skies on the user and suspending the user on a treadmill, the skier is transformed into a skier flying down the Swiss Alps. In this manner, physical activity, including a high degree of physical activity, may be achieved for the user. The simulated experience takes a user beyond a mere visual experience by adding control of the user in three-dimensional space and with controlled inputs, the experience becomes realistic. By way of contrast, suspending a user in air according to principles described herein, compared to laying the person on a horizontal surface as they are lifted, allows the user to be moved with a higher degree of fidelity and with a higher degree of inputs than the horizontal surface.

The applications herein can apply to virtual reality, in which an interactive experience immerses the user in a fully artificial digital environment. The applications may further apply to augmented reality, in which virtual objects overlay a real-world environment. Furthermore, the applications apply to mixed reality in which real and virtual worlds merge to produce new environments and visualizations. In other words, physical and digital objects co-exist and interact in real-time, encompassing both virtual reality and augmented reality. Other types of immersive technology are anticipated.

Simulations herein that include the benefit of virtual reality are further enhanced by controlled physical parameters to direct a user's movement and affect the user's perception of surroundings. In an example, simulation features described herein are applied to further enhance entertainment, teaching purposes, and rescue and training purposes. In a specific example, current technology for flight training simulations that include the use of wind tunnels are improved with features that include standing to jumping motion that would precede a flight.

"Flight" according to principles described herein means movement of human body in 3-dimensional space, not necessarily in accordance with principles of aerodynamics. Hence, this invention permits a person to, e.g., fly upwards, feet-first, with the user's head pointed towards the ground.

"Ground" according to principles described herein means any orientation-providing surface or object. The user's mind may, especially in zero-gravity environments, re-define "up" and "down" if provided sufficient suggestion by way of various inputs, controls, and procedures of the devices described herein.

In addition, a motion control system that directs the user's physical movement and orientation may be made smart by receiving information about past movement in order to respond to present movement and anticipate future movement. Moreover, the principles for accomplishing the simulation may be partially or fully automated.

An exemplary motion control system according to principals described herein includes a suspension structure, a marionette assembly, a dampening mechanism, and a navigation controller. The marionette assembly includes a housing that is slidably engaged to the suspension structure such that the housing translates in a planar manner relative to the suspension structure. A rotary component is rotatably attached to the housing, such that the rotary component rotates around an axis of the housing. A plurality of winches with cables are attached to the rotary component to allow movement of the cables. The cables pass through the dampening mechanism, the dampening mechanism to dampen or completely halt the movement of the cables. The navigation controller controls at least one of the movement of the housing, rotary component, the plurality of winches with cables, and the dampening mechanism. This control provides a controlled movement of the marionette assembly.

Another exemplary motion control system according to principals described herein includes a suspension structure, a marionette assembly, a harness, and a navigation controller. The marionette assembly is slidably engaged to the suspension structure such that translational movement of the marionette assembly is possible in at least two dimensions. The marionette assembly includes cables that are to suspend a user or object, the cables to move and rotate relative to the marionette assembly and thereby provide three-dimensional movement and rotation of the user or object relative to the suspension structure. The harness is attached to the user or object to facilitate attachment of the cables to the user or object. The harness is to collect positional data of the user or object. The navigation controller is to control at least one of the movement of the marionette assembly and cables to control movement of the user or object. The navigation controller receives the positional data from the harness and thereby determines predictive movement of the user or object and controls future movement.

Another motion control system according to principals described herein includes a marionette assembly, a dampening mechanism, a controller, and a harness. The marionette assembly includes a movable housing. A rotary component is rotatably attached to the housing such that the rotary component rotates around an axis of the housing. A plurality of winches with cables are attached to the rotary component to allow movement of the cables. The dampening mechanism to which the cables are functionally connected is to dampen or completely halt the movement of the cables. The controller provides a controlled movement of the marionette assembly by controlling the movement of the housing, rotary component, and the plurality of winches with cables. The harness is worn by a user or attached to an object to facilitate attachment of the cables to the user or object. The harness is to collect positional data of the user or object. The controller is to receive the positional data from the harness to obtain predictive movement of the user or object and thereby control future movement.

A method of controlling user interaction in a simulated environment includes suspending a user with a suspension structure and a motion control system. The method further includes receiving data related to movement of the user's body. The data is analyzed with predictive tracking software algorithms to predict future movement of the user's body.

Based on the future movement predicted, the suspension structure and the motion control system control motion of the user is to enhance the user interaction in the simulated environment.

In an example, the method further includes control of at least one of a horizontal force, a vertical force, and rotation on the user's body. The method may further control at least one visual display in a head-mounted display (HMD) to be worn by the user, the visual display to relate to the simulated environment. The method may further control the movement of the user in relation to controlling at least one of a high speed fan, scent emitter, heating element, humidity element, cooling element, air blower, sensor, and capture camera to provide a simulated experience.

A computer program product for controlling user interaction in a simulated environment includes a computer readable storage medium having program instructions embodied therewith. The program instructions, when executed by a processor, cause the processor to control 1) movement of a housing that is slidably engaged to a suspension structure, 2) longitudinal movement of cables that suspend a user, and 3) dampening or halting of the cable movement with a dampening mechanism attached to cables.

A system according to principals described herein includes a non-transitory memory that stores instructions. A computer processor executes the instructions to perform operations. Such operations include, for example, controlling three-dimensional translation and three-dimensional rotation of a user in an environment. The operations further include providing sensory type of information to the user, the information including at least one of visual, tactile, sound, smell, or taste to the user to provide the user with interaction to the simulated environment. The system may further collect data about the user to control the user. The data may also be used to control the simulated environment. The data may also be used to determine predictive movement of the user and thereby control future movement.

Motion Control System

Turning to FIG. 1*a*, an exemplary motion control system 100 is depicted that includes a suspension structure 117 having various supportive members and tracks that allow the marionette assembly 101 to move to various places within an environment. The marionette assembly 101 includes components that suspend and actuate movement of an attached user or object. At least one component of the marionette assembly 101 moves relative to at least one other component of the marionette assembly 101 to actuate movement of the user or object. Movement of the components may include one-, two-, or three-dimensional movement. Also, movement of the components may be linear, planar, rotational, axial, co-axial, or include other types of movement. In an example, movement may be directed to provide flight simulation movement including at least one of yaw, pitch, and roll.

In the example shown, the suspension structure 117 includes a first track 118-1, -2 attached to a second track 119-1, -2. As shown, the first 118-1, -2 and second 119-1, -2 tracks each include a pair of parallel rails, the first track 118-1, -2 rails laying perpendicular to the second track rails 119-1, -2. The first track 118-1, -2 rails allow a perpendicular direction of travel relative to the second track 119-1,-2 rails. The tracks 118-1, -2, and 119-1, -2 are located a vertical distance above the floor, such as at or near a ceiling of a simulation environment.

The first track 118-1, -2 is slidably attached to the second track 119-1, -2 with the first track 118-1, -2 moving along the rails provided by the second track 119-1, -2. The marionette assembly 101 is slidably engaged to the rails of the first track 118-1, -2, the marionette assembly 101 moving longitudinally along the rails of the first track 118-1, 2. The combination of the marionette assembly 101 moving along the rails of the first track 118-1 along with the first track 118-1, -2 moving relative to the second track 119-1, -2 provides the marionette assembly 101 with complete movement in the X-Y plane of the three-dimensional cartesian coordinate system.

Other examples include tracks that are angled to each other but that are not perpendicular to each other.

In another example, the second track 119-1, -2 is slidably attached to a truss structure that includes braces, support beams, or other structural members that are known in the art and that are configured to support a track system. The second track 119-1, -2 may be slidably attached at ends to vertical truss members 193-1, -2, -3, -4, which are elongate support members and which allow the second track 119-1, -2 to move longitudinally vertically upward and downward. The first track 118-1, -2, being slidably attached to the second track 119-1, -2, also moves vertically upward and downward with the second track 119-1, -2. A marionette assembly 101 is slidably engaged to the rails of the first track 118-1, -2. The marionette assembly 101 is slidably engaged to the rails of the first track 118-1, -2 such that the marionette assembly 101 moves longitudinally along the rails of the first track 118-1, 2. In addition, vertical movement of the second track 119-1, -2 with respect to the vertical truss members 193-1, -2, -3, -4 causes the first track 118-1, -2, and the marionette assembly 101 slidably attached to the first track 118-1, -2, to be repositioned in a vertical direction accordingly. In this manner, the marionette assembly 101 moves in all three directions of a three-dimensional cartesian coordinate system. In another example, the marionette assembly moves in two dimensions, including the x and z direction only, the y and z direction only, or the x and y direction only, based on the track capability of first track 118-1, -2; 119-1, -2; 193-1, -2, -3, -4, The exemplary marionette assembly 101 shown includes a housing 102, rotary component 106, and a set of winches 108-1, -2, -3 with respective cables 110-1, -2, -3. The housing 102 is slidably engaged to the first track 118. As shown in FIG. 1*b*, the housing 102 includes a box-like structure with wheels at or adjacent to four outer facing corners. The rotation of the wheels moves the box longitudinally in one-dimensional space, forward and backward, in a relatively planar motion along a pair of rails of the first track 118. The housing 102 thus has the ability to translate in a planar manner relative to the suspension structure 117. This may include, for example, a longitudinal movement from one side of a simulation effects area to an opposing side. This may further include lateral movement or movement that is perpendicular to the longitudinal movement, or in other words, movement in an X-Y direction in a cartesian coordinate system.

The housing 102 is of a suitable material, size, and dimension to support a user that is suited up for flight. The housing 102 may also support a structural form for supporting a user. In an example, the housing 102 may be approximately 4'×4'×2'. Other shapes and dimensions are anticipated.

Rotatably attached to the housing 102 is a rotary component 106 that swivels, or otherwise rotates, pivots, or spins, with respect to the housing 102. The rotary component 106 as shown includes a generally flat planar element that lays parallel to a side of the housing 102. A top component 111 attaches the rotary component 106 to the housing 102 but still allows the rotary component 106 to rotate axially with respect to the housing 102. The top component 111 may be a spinning plate that rotates axially relative to the housing 102. The spin of the rotary component 106 effectively controls yaw of the marionette assembly 101. Roll and pitch are controlled by winches 108-1, -2, -3 which are discussed below. Note that the top component 111, instead of a spinning plate, could also be a ball joint or other component with a rotation type of movement, however, this would further impact the roll and pitch. The position of the rotary component 106 may be adjacent to or flush with the housing 102, or may be located within the housing 102. Other variations are also anticipated.

The rotary component 106 as depicted in FIG. 1*a* is adjacent to the housing 102 and is shown being triangular in shape, however, other shapes, such as circle, oval, square, rectangle, spherical, ovoid, or pyramid shaped, and other shapes are anticipated. The dimensions of the rotary component 106 may be approximately 3.5'×3.5'. Other dimensions are anticipated. The rotary component 106 rotates with respect to a central, vertical axis of the housing 102. This allows a user or object being suspended from the rotary component 106 to also experience a rotational movement. The rotational movement may be free or may be controlled by a source, such as a server system, controller, or other control means.

Attached to the rotary component 106 are a plurality of electronic winches 108-1, -2, -3 or other mechanical devices used to pull in (wind up) or let out (wind out) or otherwise adjust the tension of the cables 110-1, -2, -3. Each winch 108-1, -2, -3 includes a pulley or other type of rotational mechanism that includes axially rotation to raise and lower a respective cable 110-1, -2, -3. Each cable 110-1, -2, -3 can be controlled separately or together in unison. Each cable 110-1, -2, -3 is attached to the winch 108-1, -2, -3 such that the cable 110-1, -2, -3 is vertically lifted and lowered by rotational movement of the pulleys 109-1, -2, -3 of the respective winches 108-1, -2, -3. As shown, a winch 108-1, -2, -3 is located at each corner of the rotary component 106.

The rotary component 106 may be fixed to the winches 108-1, -2, -3 or may allow for movement. For example, the winch 108-1, -2, -3 may swivel or otherwise pivot relative to the rotary component 106 or housing. As shown, each winch 108-1, -2, -3 is attached with a ball joint that allows the winch 108-1, -2, -3 to have freely spinning spherical rotation with respect to the rotary component 106. The free rotation of the winches 108-1, -2, -3 allows for free uncontrolled movement, including small movements of the user's trunk and limbs as the user experiences the simulated environment. Other types of rotation are anticipated, such as a simple rotation about a vertical axis. For example, at least one of the winches 108-1, -2, -3 may rotate about a respective vertical axis.

In summary, the movement of the marionette assembly 101 as depicted in FIG. 1*a* includes that the housing 102 have linear translation in the X-Y plane with the suspension structure 117 (e.g., first track 118-1, -2, second track 119-1, -2, etc.), the rotary component 106 have axial rotational movement relative to the housing 102, each winch 108-1, -2, -3 provide free rotation or other rotation of the cables 110-1, -2, -3 relative to the rotary component 106, and the cables 110-1, -2, -3 be pulled in and let down by the winches 108-1, -2, -3. Thus, the marionette assembly 101 can move and rotate the user in three dimensions.

Note that the various components described may rotate in a different manner than what is described. Rotation of components may be axially, free spinning rotation, or otherwise. Components may have linear or planar movement relative to other components. Rotation and movement of the components may be free or controlled. Also, at least one component may be controlled by a source, such as a server or a controller, according to an example of principles described herein. Furthermore, note that more or less components, or a variation of components may be used to accomplish the purposes of the marionette assembly 101.

A connective panel 115 is attached to the suspension controller at free ends of the cable. As depicted the connective panel 115 is T-shaped with free ends attached at each end of the T. Other shapes are anticipated and may include for example, circle, rectangle, oval, donut, and other shapes and sizes. The connective panel 115 includes locking structures, such as quick connect structures that may be used to attach the panel to a suit system worn by the user. The connective panel 115 further includes at least one of accelerometers, gyroscopes, and magnetometers to determine information from at least one of a specific force, an angular rate, and an orientation of a user's body. This may take the form of an inertial measurement unit (IMU) or other electronic device. The information may include, for example, telemetry position and rotation data.

A motion capture system further enhances the experience by capturing information related to the user's body or other structure or aspects that relates to motion of the user's body. Such a system may include one or more motion capture devices, such as at least one of a camera and sensor. A capture device can be located on the truss or tracks of the suspension structure. Walls within an area may also be used. The capture device can be within or above the preparation area and the simulation effects area. The capture may include pointing toward the user's physical location when the user is attached to the panel or other components of the system. Capture devices may run, for example, at 205 hz or greater, feeding positional telemetry data back to the motion control system in real-time, allowing predictive tracking software algorithms to analyze the data and drive all of the motion controls system components accordingly.

Simulation Environment

Turning to FIG. 2, a simulation environment 200 is shown for providing a simulated experience using the motion control system 100 that includes the suspension structure 117 and the marionette assembly 101. The motion control system 100 is used in such an environment to provide motion that may include walking to flight, jumping to flight, flight, flight to landing, falling to landing, diving, and other motions that are readily anticipated.

An example simulation environment 200 includes a series of adjacent or otherwise communicable areas, including server area 127, preparation area 124, suit up area 123, simulation effects area 126, and control and monitoring area 126. Each area may be connected to at least one other area to facilitate transition and allow for a compact enclosure. The areas together make up for a complete experience and will each be described in turn. The actual order of the user entering an area may be different than the order presented herein. Also, the number of areas may be more or less than the number of areas presented. Furthermore, at least one area may be combined with another area.

Server Area

The server area 127 includes a space that is designated for equipment that runs behind the scenes and includes, for example, at least one server and a navigation controller. A server receives motion data and other data and uses the information to move the user's body and provide enhancements such as wind, light, dampening, and other effects. A navigation controller actuates the enhancements using the data and analysis and automation provided by the server. The navigation controller uses data to control the motion control system. The navigation controller accomplishes this by incorporating data that is processed or otherwise provided by the server in real-time to provide commands related to the motion control system. Commands are used for such things like position, rotation, and height adjustment for winches and the housing. Equipment including a server and navigation controller is further described below.

Suit Up Area

The suit up area 123 includes a designated space in which a user first enters and dons appropriate attire. Attire may include at least one of a suit system, harness, head-mounted display (HMD), back attachment, hand devices, footwear, or other attire, components, or devices. Attire may be donned in sequence involving more than one are. For example, the suit and HMD may be donned in the suit up area 123 while the back attachment is donned in a different area. In an example, the back attachment is attached at the last minute so that the user is less aware of such attachment.

Preparation Area

Once suited up with at least one attire, the user exits the suit up area 123 and enters a preparation area 124 that momentarily precedes the motion experience, which may be a jump, flight, drop, or other motion. In an example, the preparation area 123 is used to do a final check on whether or not the user is dressed properly and has the appropriate equipment. In an example, the user receives an HMD 164 (see FIG. 10) or other device for visuals that enhance the experience. Other final preparatory procedures or final fitting may occur. The preparation area 123 may further conceal flying simulation components to keep the user from knowing what to expect during the experience. The preparation area 123 may be relatively small compared to standard rooms so as to limit the amount of motion the user can make before the flight simulation. However, the preparation area 123 may have at least one retractable wall 122 and retractable ceiling 121 to expand the space around the user as the user takes off for flight other experience.

The retractable ceiling 121 has the ability to open and close at a top opening of the space. This may be accomplished automatically after the user enters the preparation area 123, based on the programming settings for the experience. In an example, when the user sees the simulated environment in an HMD display or other display, at least one retractable wall 122 and retractable ceiling 121 are retracted to provide space to correspond with the simulated environment. For example, at least one retractable wall 122 and a retractable ceiling 121 may be retracted to define a 12'×12'×18' space or another space that allows the user to stretch out their arms and jump or run forward.

The preparation area 123 may further include a movable floor 128 that provides a surface on which the user stands and that moves in at least one direction, such as backward, forward, side to side, vertically up and down, slanted, or in another direction. The movable floor 128 may include the entire ground surface within the preparation area 123 or a portion thereof. Furthermore, there may be more than one movable floor within the preparation area 123. In an example, the movable floor 128 moves backward to make the user fall unexpectedly downward. In another example, the movable floor 128 rises to correspond with a simulated display of a mountain in which the user must climb to take flight. Also, an omnidirectional treadmill for walking and running simulations is used. In an example, the walking and running simulations with the omnidirectional treadmill is paired with flight simulations.

In an example, the movable floor 128 is raised to a desired level for the user to take off. For example, the height of the movable floor 128 may be raised to be 5'-6', 6'-7', 7'-8', 8'-9', and 10'-20' from its initial position. Any height that allows the user to be displaced a vertical distance from the ground is anticipated. The act of lifting the floor may occur automatically. The time may be 30-60 seconds, 60-120 seconds, 120-180 seconds, and so forth depending on the height desired and time desired. An exemplary height is 6' within 90 to 120 seconds.

In another example, the movable floor 128 includes a floor scale 120 that reads the weight of the user when the user stands on the movable floor 128. The weight and any other information pertaining to the user by the movable floor 128 and floor scale 120 is used to configure the motion control system 101, simulation effects, and other features of the simulated environment for the user. The floor scale 120 may be separate from the movable floor 128, embedded in the movable floor 128, or integral with the movable floor 128. The floor scale 120 may be located anywhere on the floor. For example, the floor scale 120 may be located along a central axis of a path that leads to the simulation effects area 9. Other locations are anticipated. Also, edges of the floor scale 120 may be raised from the floor or the floor scale 120 may have defining features for enabling the user to sense its location relative to the movable floor 128 or floor for aid in the user positioning the user's body relative to the floor scale 120.

The preparation area 123 may be kept dark in order for the user to remain unaware of the actual surroundings. Additionally, the retractable ceiling 121 or retractable wall 122 may include a vinyl type of material that is printed to look like metal or a solid surface, or have other features, to camouflage the retractable nature of the retractable ceiling 121 or retractable wall 122.

The retractable wall 122 in the preparation area 123 facing the next area in line may be retracted from an upper height to a lower height to reveal the next area in line. In an example, the retractable wall 122 is lowered to reveal a simulation effects area 126, as described below, or a portion thereof. For example, the retractable wall 122 may be lowered from 8' to a lower 3 to 4' vertical position. The user may thus see into at least a portion of the simulation effects area 126 to move within the simulated environment or to be donned with further components, such as the marionette assembly 101 and HMD 164 (see FIG. 10). In another example, the user is unaware of the lowering wall 122, seeing only the visuals in the HDM 164 (see Id.).

Simulation Effects Area

The simulation effects area 125 works in sync with the motion control system 101. The simulation effects area 125 is configured with simulation effects 130 including effects equipment, such as one or more high speed fans, scent emitters, moisture elements (e.g., humidifier, water misting system, black ice, etc.), heating elements, cooling elements, and air blowers. The simulation effects area 125 also includes a tracking system 130 which may include at least one camera or other motion tracking device, such as laser range finder, radar, lidar, sonar, radio frequency identification (RFID), or Bluetooth technology. Markers being tracked may include LEDs, reflective markers, 3-dimensional markers, magnetic markers, radio frequency technology, wireless fidelity (Wi-Fi), and other markers or technology known in the art. Sensors and other sensing technology may also be used.

In an example, at least one of the retractable ceiling 121 and retractable wall 122 is retracted for the user to enter the simulation effects area 126. Upon entering, the user is attached to the motion control system 101 and the HMD 164 is presented or made visible so that a user can securely position the HMD 164 on the user's head. The HMD 164 may be located within reach of the user. This may be above a user's head, attached to a wall, on a table, or other place that allows for the user to don the HMD 164 with relative ease.

The simulation effects area 126 provides the area in which the user may freefall or flight or other experience. As shown, the area may include at least two or more room heights to allow a height in which the user may drop. The effects by the display, fans, and other equipment may be used to make the drop height seem like more than the actual height available in the simulation effects area 126.

Control and Monitoring Area

A control and monitoring area 125 may be located adjacent to the simulation effects area 126 and provides a space in which an attendant or other outside observer may observe, monitor, and override the system. The control and monitoring area 125 may further provide a quick and easy physical access into the simulation effects area 126 to aid the user or make adjustments as needed to the simulated environment.

As part of the motion control system 100, the cables 110-1, -2, -3 may pass through or otherwise be functionally connected or associated with at least one dampening mechanism, such as dampening mechanism 112 that backs up the desired movement of the cables 110-1, -2, -3 in the simulation environment 200. Particularly, the dampening mechanism 112 may be used to control the cables 110-1, -2, -3 all at once or individually. In an example, the dampening mechanism 112 may act by slowing or completely stopping all of the cables 110-1, -2, -3 at a given time. In an emergency, the dampening mechanism 112 may be activated to override the system to stop the cables 110-1, -2, -3 or release the cable position 110-2, -3, -3 and let the user down or lift the user to a desired height, such as the initial take-off height. In another example, each cable or at least two cables are associated with a separate dampening mechanism so that each cable is slowed down separately and independently from each other.

The dampening mechanism 112 is shown as being located in the simulation effect area attached to the top of the suspension structure (e.g., truss, track, etc.) and above the retractable ceiling 121. The motion control system 101 is located below the dampening mechanism 112. Other setups are possible that allow the cables to be functionally attached to the dampening mechanism 112. In an example, the dampening mechanism 112 is attached to a wall, located on the floor or other ground surface. The dampening mechanism 112 may be attached to a movable surface, such as the housing 102 (see FIG. 1a) or other surface.

Motion Control Examples

Figure 3A:
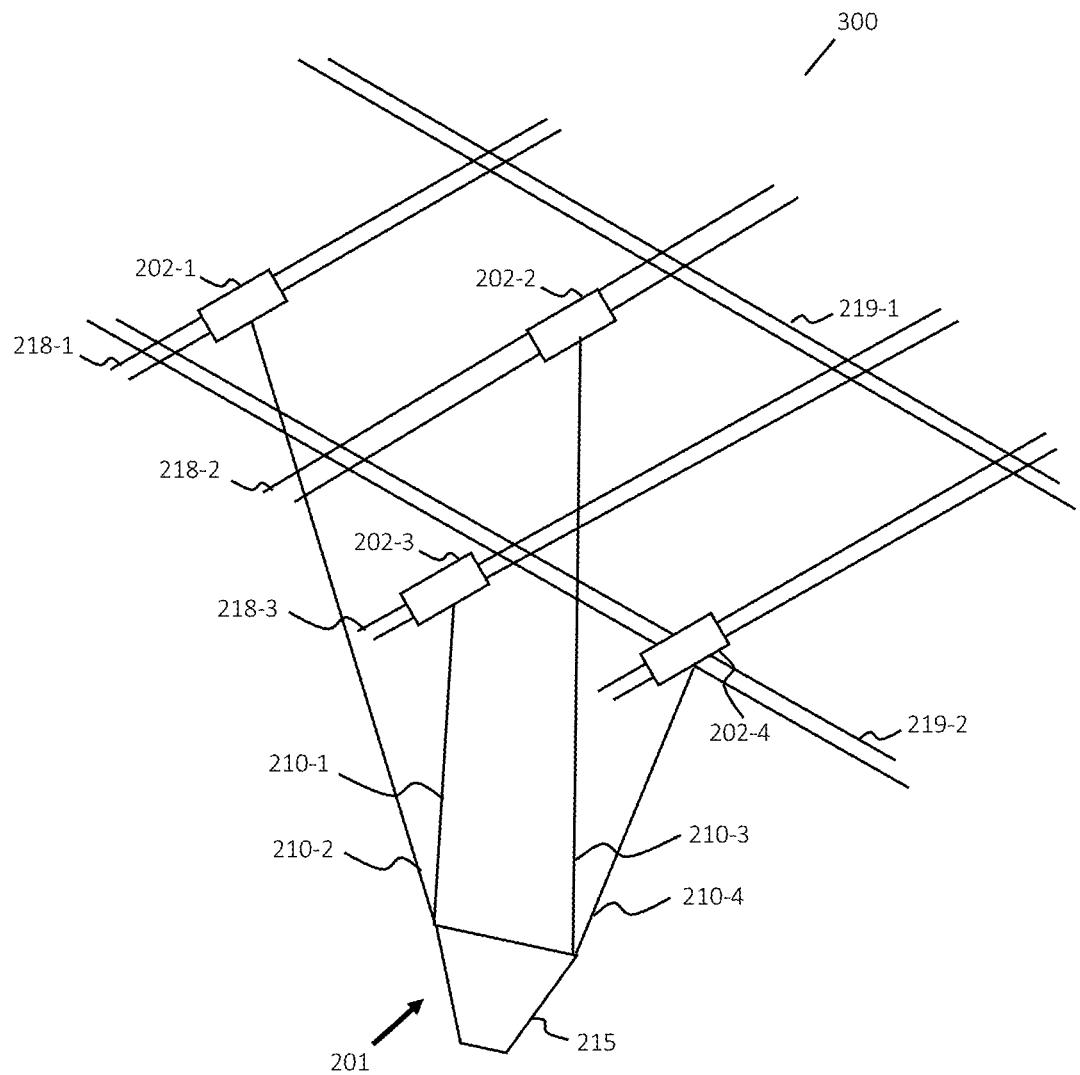
FIG. 3a illustrates a perspective view of a motion control system according to an example of the principles described herein.

Another example of a motion control system is shown in FIG. 3a. The motion control system 300 includes multiple tracks that are perpendicular to each other, namely, a first set of tracks 218-1, -2, -3, -4 that lay perpendicular to a second set of tracks 219-1, -2. The same principles applied throughout the description may also be used with the motion control system 300. The motion control system 300 is simplified to show certain components, but other components and features described in the description may also be a part of the motion control system 300. As shown, multiple housings are each associated with respective independent tracks. The first set of tracks 218-1, -2, -3, -4 move relative to the tracks 219-1, -2. Housings 202-1, -2, -3, -4 move along respective tracks 218-1, -2, -3, -4. In this manner, each respective cable 210-1, -2, -3, -4 of the marionette assembly 201 is moved separately and independently from each other. Tracks 218-1, -2, -3, -4 and 219-1, -2 may be raised or moved according to principles discussed herein.

Figure 3B:
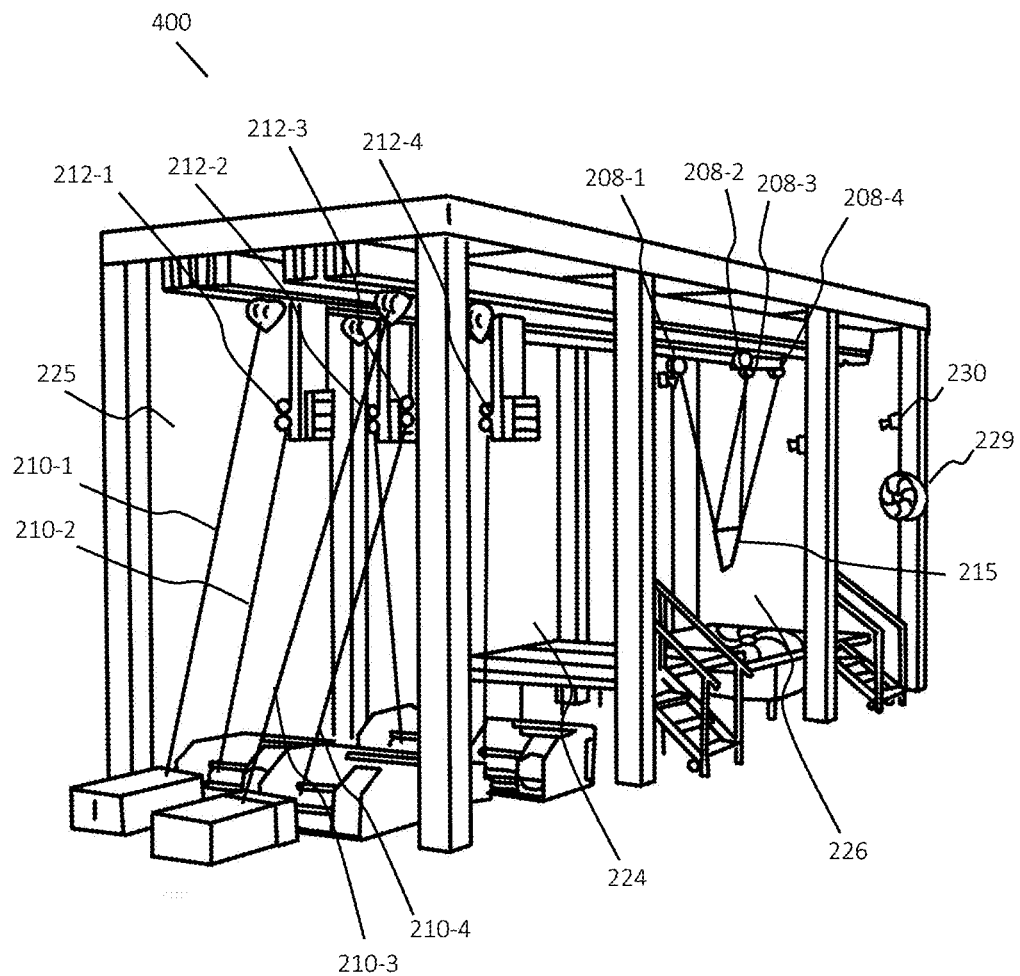
FIG. 3b illustrates a perspective view of a motion control environment according to an example of the principles described herein.

Turning to FIG. 3b, another example of a simulation environment is shown. The simulation environment 400 includes a row of areas that are communicably connected or otherwise adjoined. The track arrangement described for motion control system 100 and 300 as well as other motion control systems may be implemented. The motion control system 300 shown includes winches 208-1, -2, -3, -4 which are attached to housings 202-1, -2, -3, -4 (see FIG. 3a) and which are slidably attached to tracks 218-1, -2, -3, -4 (see FIG. 3a). At least three areas are anticipated, including a control and monitoring area 225, a preparation area 224, and a simulation effects area 226. The control and monitoring area 225 allows the attendant to check and access the dampening mechanism 212-1, -2, -3, -4, which are attached at the top of the truss system. with respective cables 210-1, -2, -3, -4 attached to them. The cables 210-1, -2, -3, -4 extend from respective winches 208-1, -2, -3, -4 and to the connective panel 215.

In the preparation area 224, the user may suit up with proper equipment, suiting, and marionette assembly. The user may be given instructions also. Other preparations may also be provided.

The walls of the preparation area 224 may then be retracted to reveal the simulation effects area 226. The user may step off the ground, jump, experience flight, or have another simulated experience.

Suit System

Turning to FIGS. 4a, 4b, and 4c, various views of a suit system 500 are shown. The suit system 500 is used to position the user's body for motion, such as jumping or flight and enhance the experience. The air flow on the body can also be more fully controlled.

FIG. 4a illustrates the front of a suit system 500 which includes a body suit 133 or other type of body covering. The body suit 133 may cover a substantial portion of the body. This may include a substantial portion of the upper and lower limbs, as shown. The material of the body suit 133 or a different material may span between locations at or adjacent to ends of the limbs to define a webbing 134. The material of the webbing 134 may the same or different and may have the same or different properties. In an example, the material of the webbing 134 is relatively thinner than the suit material. The webbing 134 may also be stiff to keep the limbs in a desired flight or freefall position. In another example, the webbing 134 is flexible to allow the user to more easily adjust position and move arms and legs relative to each other. As shown, the webbing 134 extends between arms and legs and in between legs.

Openings of the body suit 133, such as a neck opening and arm opening, may be snug or tight-fitting to restrict air from entering the body suit 133. The body suit 133 may further include a surround 141, which includes a stiff structure or tubing that holds the body suit 133 with outstretched arms, straight back and trunk and outstretched legs or other position as desired.

FIG. 4b illustrates a cutout view of the body suit 133 in which a harness 135 can be seen. The harness 135 may be inherently part of the body suit 133, attached to the body suit 133, or be a separate unit altogether. In an example, the harness 135 is like a parachute harness or a vest like structure. The harness 135 wraps around a trunk area of the body. The harness 135 may have holes or air inlets which allow air to enter into the body suit 133. This may be done to keep the user cool or intensify the simulation experience with the user feeling the wind simulated in the simulation environment. Shoulder straps extend over the shoulders to further support the harness 135 on the body and keep the harness 135 in place on the body. The harness 135 is used not only like a jacket to keep the body suit 133 on the body and support the surround 141 and other components of the body suit 133, but it is also used to attach components to the body.

States of various devices used in the simulated environment and their relation to the user may be communicated to attendants, the tracking devices, or other entities and devices. The harness 135, for example, may have a status light 194-1 as shown or other indicator to communicate a state of the user or the harness relative to the user, such as the harness being attached properly or not. The status light 194-1 may further have blinking lights, strobe lights, or another visual indicator of the state of the user or the state of the harness 135 relative to the user. Instead of a light, a sound may be emitted. Status lights throughout the description may have at least one type of light or sound feature.

Turning to FIG. 4c, a rear view of the body suit 133 depicts a back attachment 136 that is used to attach the marionette assembly 101 and other components to the back of the body suit 133 and indirectly, to the back of the user.

A status light 194-2 is shown on the back attachment. Along with status light 194-1, both the front of the user and the back of the user may be used to provide visual indicators. The status light 194-2 may be used specifically to indicate proper or improper attachment of the back attachment to the harness 135, the body suit 133, or other component of the suit system 500.

Note that status lights may serve as tracking marker, or serve a dual purpose as both a tracking marker and as a visual indicator.

Figure 4F:
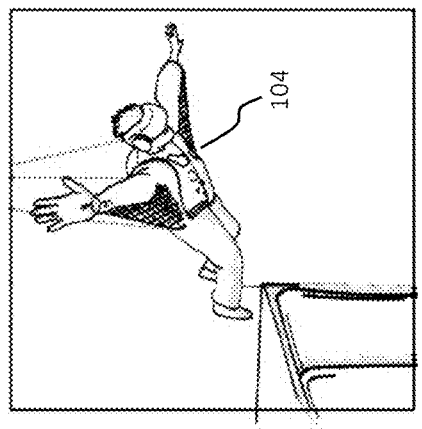
FIG. 4f illustrates a user experiencing a VR simulation of flight according to an example of the principles described herein.
Figure 4E:
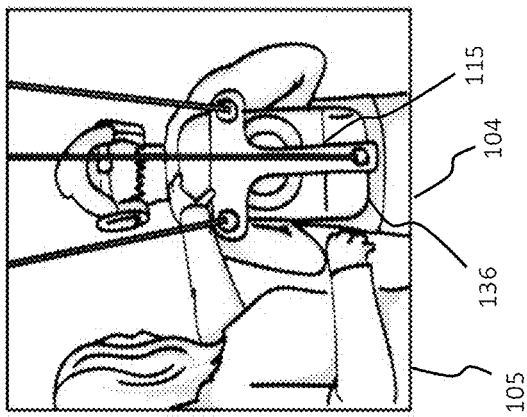
FIG. 4e illustrates a panel being attached to a back panel according to an example of the principles described herein.
Figure 4D:
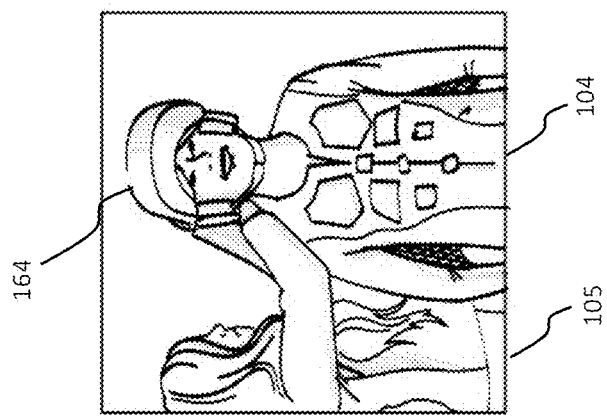
FIG. 4d illustrates a user donning a head-mounted display (HMD) and a suit system according to an example of the principles described herein.

FIGS. 4d, 4e, 4f illustrate a user 106 that dons the appropriate attire and then takes off for a flight simulation. FIG. 4d illustrates an attendant 105 helping a user 106 with a suit system 500 (see FIGS. 4a, -b, -c) don an HMD 164. In FIG. 4e, the attendant 105 attaches the panel 115 to the back attachment 136. In FIG. 4f, the user 106 takes off for flight.

Figure 5:
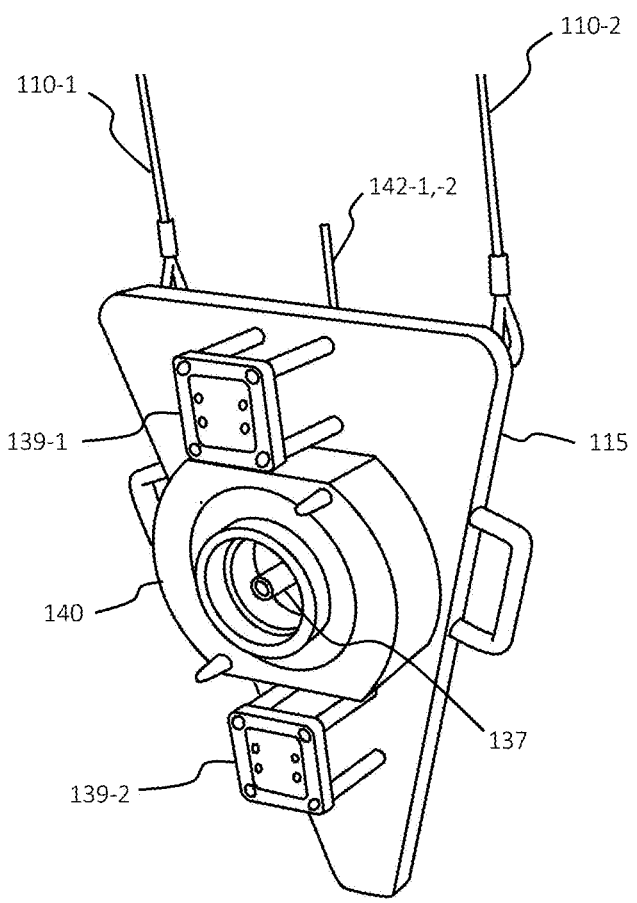
FIG. 5 illustrates a perspective view of a connective panel, according to an example of the principles described herein.

Turning to FIG. 5, the connective panel 115 is shown in greater detail. The exemplary connective panel 115 shown includes various devices that align with and connect with corresponding components on the back attachment 136 (see FIG. 6a). The connective panel 115 is shown as being triangular with two corners corresponding to the shoulders of the user and a base corner corresponding to the lower trunk of the user. The connective panel 115 may be other shapes as well, including square, rectangular, oval or other shape. The connective panel 115 may include at least one alignment component that enables the connective panel 115 to be aligned with the harness 135 to effect attachment of the connective panel 115 with the back attachment 136 of the harness 135 and thus the user in an efficient manner.

The connective panel 115 includes attachment points at which free ends of cables 110-1, -2, -3 may be connected. The harness 136 as shown includes attachment points at or near the corners of the triangular panel 115, (the bottom corner attachment is not shown).

Alignment components include magnets 139-1, -2, with magnet 139-1 being at or near the top of the connective panel 115 in between the two apex corners and magnet 139-2 being at or near the bottom corner of the panel 115. The back attachment 136 of the harness 135 may include corresponding magnets that attach to the magnets 139-1, -2 of the panel 115 of the harness 136 (see FIG. 6a).

In addition to magnets 139-1, -2, an air line connect 137 is shown centrally located on the panel 115 and in between the magnets 139-1, -2. The air line connect 137 enables an air line to be connected to the body suit 133 and supply air to the suit system 500. The air line connect 137 may further comprise a power line connect and a data cable connect as one line. In an example, a power line connect connects to a power line with at least one of the suit system 500 and the HMD 164. In another example, a data cable connect connects to a data cable for at least one of the suit system 500 and the HMD 164. A power line connect and data cable connect each having a common location as the air line connect 137 on the connective panel 115 provides an efficient, one stop connection of all three connects. In another example, at least one of the air line connect, power line connect, and data cable connect requires a separate location and a separate connection action on the connective panel 115.

In an example, a power line 142-1 connected to a power line connect attaches to the back attachment 136 of the harness 135 and provides power to various components of the suit system 500 and the HMD 164. In another example, the power line 142-1 also connects directly to the HMD 164. More than one power line is anticipated. The suit system 500 and HMD 164 may also operate by battery or other sources of power.

In an example, a data cable line 142-2 connected to a data cable connect attaches to the back attachment 136 of the harness 135 and collects data from the various devices and features of the suit system 500. The data cable line may also receive data for examples that include devices on the suit system 500 or HMD 164 that receive data.

Attachment of the Marionette Assembly

Figure 6A:
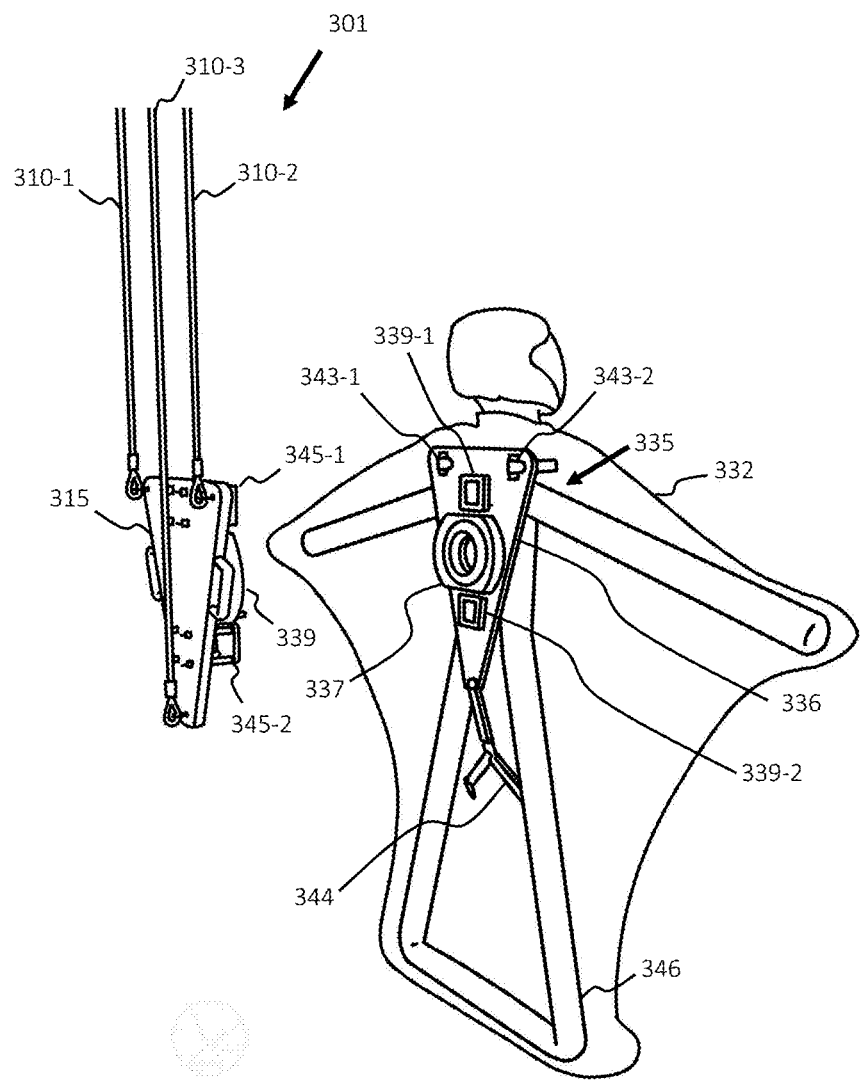
FIG. 6a illustrates a connective panel being positioned for attachment to a harness of a suit system, according to an example of the principles described herein.

Turning to FIG. 6a, the marionette assembly 301 is shown being aligned with the harness 335 of a user. The cables 310-1, -2, -3 may be lowered and adjusted to align the connective panel 315 with the back attachment 336. This further includes aligning the magnets 345-1, -2 on the connective panel 315 with corresponding magnets 339-1, -2 on the back attachment 336. With the proper alignment, the air line connect 337 of the connective panel 315 can be properly secured to the air line connect 337 of the back attachment 336.

The back attachment 336 may be inherently part of, permanently fixed to, or removably attached to the harness 335. If the back attachment 336 is indeed removable, other types of back attachment devices may be interchanged with the suit system 500 to support different types of simulation experiences, accommodate different heights and weights, or attach to objects instead of users.

Note that the back attachment 336 shown is removably attached to the body suit 332 by shoulder connects 343-1, -2 and leg connect 344. The shoulder connects 343-1, -2 and leg connect 344 may include straps, ties, hook and loop, or other types of securement that allows for a secure connection to the body suit 333.

Note also that the body suit 333 includes hollow ribs 346, an example of a surround 341 in supporting the body suit 333. The hollow ribs 346 shown are structural tubular support members that are rigidly fixed to position and support a user's body as shown. As shown, the hollow ribs 346 extend from both sides of the back attachment 336 to ends of the arms. The hollow ribs 346 further extend from the back attachment 336 to both ends of the legs and between the legs. The air line connect 337 allows air to be communicated directly to the interior of the hollow ribs 346. The air line connect 337 also allows air to be removed from the interior of the hollow ribs 346.

Figure 6B:
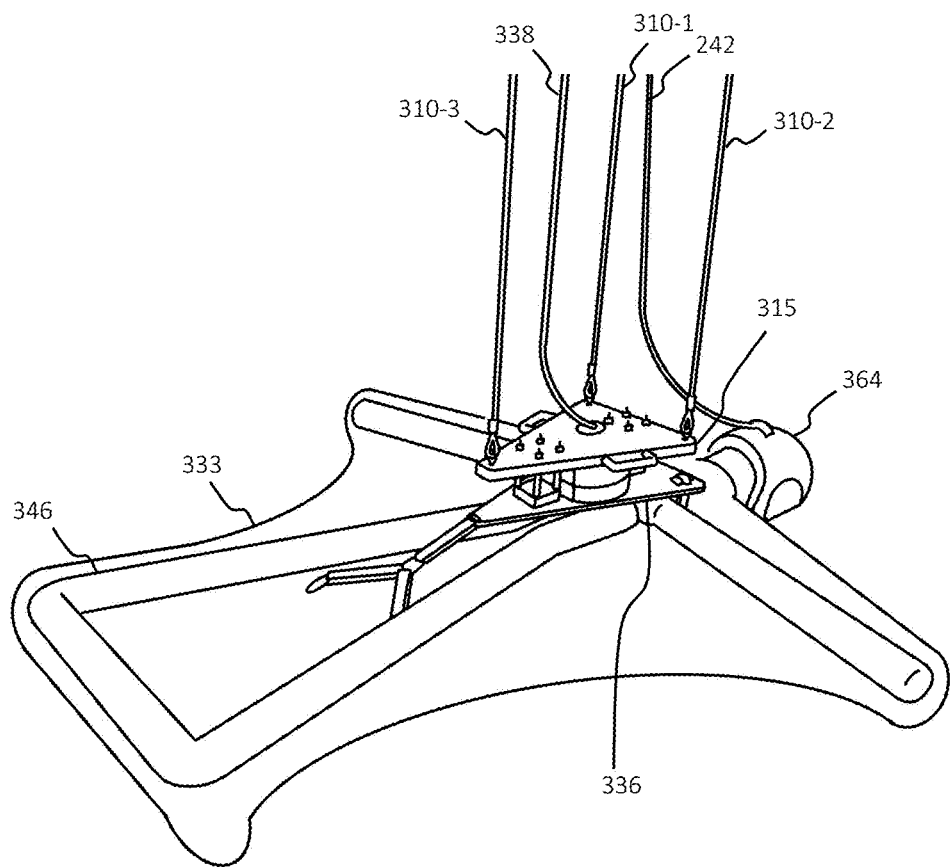
FIG. 6b illustrates a user suspended by a marionette assembly, according to an example of the principles described herein.

Turning to FIG. 6b, the user is shown in flight with cables 310-1, -2, -3 attached to the connective panel 315 which is attached to the back attachment 336 and thereby suspends the user in the body suit 333. The hollow ribs 346 keep the user's body in a spread position with arms outstretched and legs spread in a planar manner. The hollow ribs may also attach to other areas, such as the neck and head. A power line 342 extends to the HMD 364 to provide power to the various components and features. A power line may also be present combined with air line 338, according to principles described herein.

Head-Mounted Display (HMD)

Figure 8:
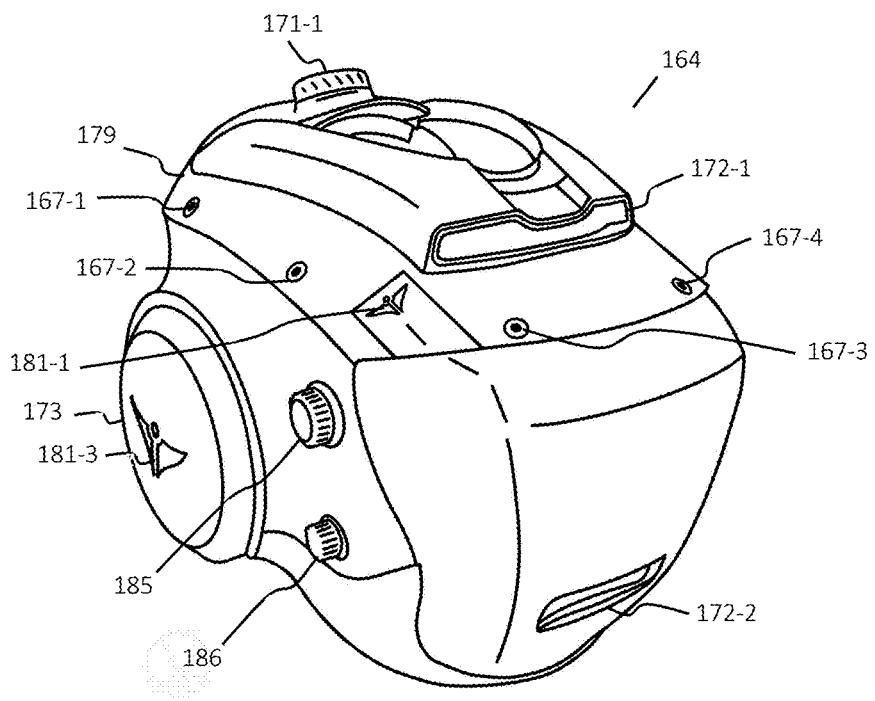
FIG. 8 illustrates a perspective view of an HMD, according to an example of the principles described herein.
Figure 9:
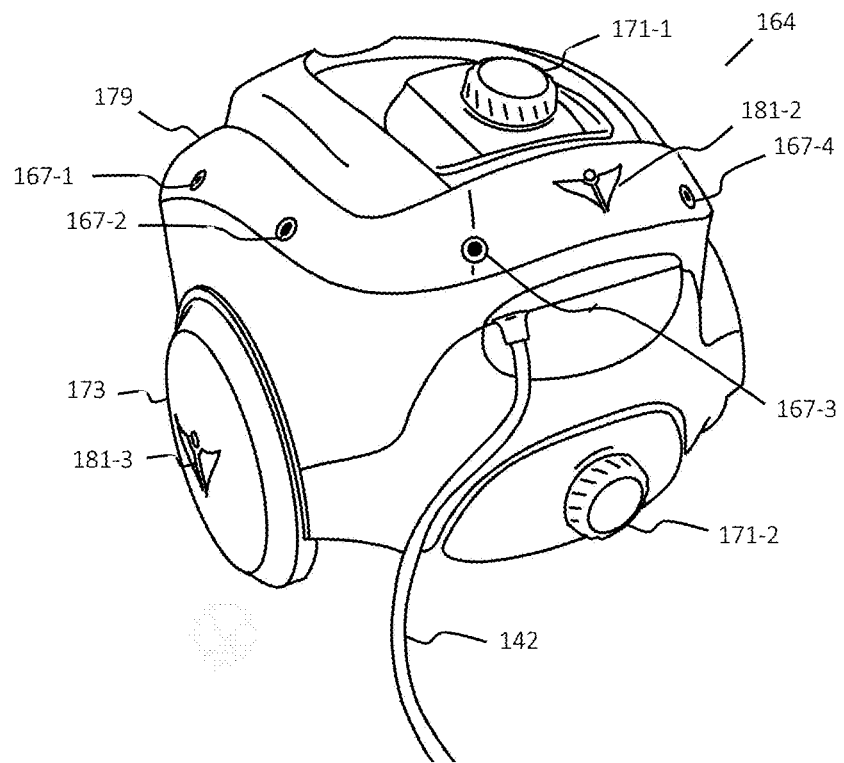
FIG. 9 illustrates a perspective view of an HMD, according to an example of the principles described herein.

A "head-mounted display" (HMD), as used herein, includes a display device worn on the head 165 of the user. It may be part of a helmet, a set of goggles, or other head supported device. An exemplary HMD 164 is depicted in FIGS. 7, 8, and 9 and includes a shell 179; tightening valves 171-1, -2; air inlet 172-1, -2; gearing system 132; sensor 170 for skin surface; shroud 163; cameras 166-1, -2, -3; visual display 180; microphone 174, etc.

Figure 7:
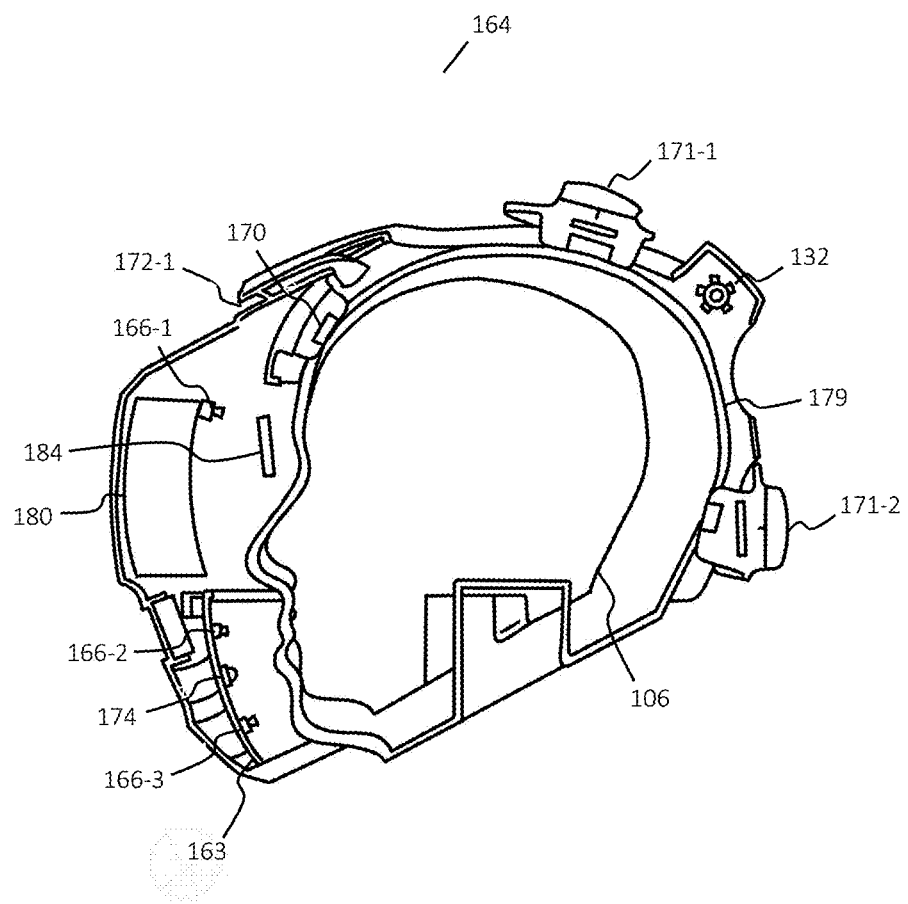
FIG. 7 illustrates a side cutout view of a head-mounted display (HMD), according to an example of the principles described herein.

A side cutout view of the HMD 164 is shown in FIG. 7. The HMD 164 includes a shell 179 or covering over the user's head 165. The shell 179 is adjustable for various head sizes and desired fit between users. In an example, the shell 179 is adjustable by two tightening valves 171-1, -2 that are located on the shell 179. Tightening valve 171-1 is located an upper region of the back of the head and tightening valve 171-2 is located on a lower region of the back of the head and a neck of the user. The tightening valves 171-1, -2 tighten and loosen the walls of the shell 179 toward and away from the head 165. The tightening valve 171-1 on the upper region may be used to tighten the shell round the head. The tightening valve 171-2 on the lower region may be used to loosen and tighten the opening of the shell 179 to help the user put on and take off the shell 179. In an example, the tightening valve 171-1 on the upper region adjusts the shell with a force that is normal to the head surface of the user 106. In an example, the tightening valve 171-2 on the lower region is angled relative to the surface of the tightening valve that is positioned on the head surface of the user 106, following a natural curvature of the neck so that the tightening valve 171-2 is easy to maneuver and yet the force applied is still normal to the head surface of the user 106. Pads or other surfaces may be moved by the tightening valves 171-1, -2 to directly contact the head of the user 106.

Air inlets 172-1, -2 are shown at or near the forehead of the head and at or near the mouth of the shell 179. The air inlets 172-1, -2 include openings that may be adjustable in size and that are configured to allow air to flow within the shell 179. This allows the user 106 to experience air flow that would be associated with the actual environment that is being presented in the form of a simulated environment.

The HMD 164 further includes a visual display 180 which provides a screen for the user to see the simulated environment. The visual display 180 may also allow a user to see through the screen to see the actual environment or a combination of the actual environment and simulated environment. Actual visuals displayed may include actual objects and persons and simulated visuals may include simulated objects and persons. The visual display 180 may be adjusted by a range dial 186 that is attached to an outer facing surface of the shell 179 on the side or other location.

Various degrees of rotation may be associated with a virtual range of travel. In an example, a 90 degree rotation of the range dial 186 is associated with a full range of travel in the simulated environment.

Along with the visual display 180 is a viewing lens 184 which may be adjusted to help the eyes focus and thus increase the visual acuity. In an example, the viewing lens 184 can be adjusted to account for inter-pupillary distance as well as the focus. The viewing lens 184 may further reflect projected images to create a simulated environment. The viewing lens 184 may be adjusted by a focus knob 185 that is attached to an outer facing surface of the shell on the side or other location. Adjustments such as the focus knob 185 and range dial 186 may be grouped together in proximity on the exterior of the shell or other location in order to be intuitive to the user 104.

On the forehead facing region of the shell 179 is a sensor 170 that contacts a skin surface of the forehead and that is used to obtain at least one of a perspiration level and a heart rate of the user or other measurement of the skin on the forehead. The sensor 170 may be, for example, a pad that is positioned to be normal to a head surface, such as at or adjacent to the forehead.

The HMD 164 may have features that allow the HMD 164 to be cleaned or sterilized between uses. To that end, at least one of the components of the HMD 164 may be removable. In an example, the HMD 164 includes a removable shroud 163 at or adjacent to the mouth region of the shell 179 which includes a covering that surrounds the mouth region, or mouth and nose region. The shroud 163 may removably attached, clipped, fitted, or otherwise fastened to the shell. The attachment may be a friction fit or require a strap, snap, button, belt, or other locking structure. By removing the shroud 163, germs and mouth fluids may be more easily removed and the shroud 163 sterilized.

The HMD 164 further includes a microphone 174 that is located on the shell near the mouth of the user 104. The microphone 174 may be permanently attached or removably attached to the shroud 163. The microphone 174 receives words and sounds of the user to enable an attendant to hear the user. Also, the words and sounds of the user may be incorporated into the simulation environment as part of the user experience. In an example, the words of the user are interactive with other users in the same simulation environment or a different environment, actual or simulated. Note that the simulated environment described herein may be used with multiple users at the same time. Also, different simulated environments in different locations may be merged so that users in vastly different locations can be present together in the simulated environment.

At or near either ear of the user, the shell 179 includes at least one headphone 173. The headphone 173 may provide sound to the user 106 in reference to the simulated environment. Also, the headphone 173 may cancel noise, such as noise caused by airflow. The headphone 173 may provide background noise, such as music. The headphone 173 helps immerse the user in the simulated environment with sound that is appropriate or to otherwise to be expected in the simulated environment.

To capture facial expressions of the user, at least one camera may be mounted on an interior facing surface of the shell 179. As shown, two cameras 166-2, -3 are located at or adjacent to the user's mouth region. The two cameras 166-2, -3 may be permanently attached or removably attached to the shroud 163. The cameras 166-2, -3 capture the mouth as it changes expression and speaks. This allows the server 148 (see FIG. 15) and controller 114 (see FIG. 15) to obtain information about the user's mouth. In an example, the information is used to replicated the user's mouth or features of the user's mouth on an avatar or other representation in a video game format or other visual format. The information may further be used to control the simulated experience and simulated environment. In an example, the information is used to communicate with other users or robotic figures in the simulated experience and simulated environment. In another example, the information is used to support anticipation of the user's next response to the simulated experience and simulated environment. For example, information that indicates that the user is screaming at a robot that jumps out at the user may indicate that the user will next move at least one limb to back away from the robot. The simulated environment may then be controlled to hold the user back or guide the user away, by moving the tracks or cables, etc.

Another camera 166-1 is located in front of or adjacent to one or both eyes of the user 106. The camera 166-1 tracks movement of at least one of the pupils of the user 106. In another example, the inter-pupillary distance between of the pupils may be obtained through images taken by the camera 166-1. The movement information indicates the direction in which the user is looking. The information can also be used to identify if the pupils are dilated. In an example, the eyes being dilated indicates that the user is 106 frightened. This may be used to anticipate the user's next response. This, in turn may be used to control the cables, tracks, and other control features being used in the simulated experience and simulated environment. The movement of the pupils may also be used to replicate the eyes in an avatar of other representation in a video game format or other visual format.

At least one LED is located on the outer surface of the shell 179. As shown in FIGS. 8 and 9, LEDs 167-1, -2, -3, -4 are located circularly around the top of the head in a crown-like position, each LED 167-1, -2, -3, -4 being equally spaced apart from each other. A motion tracking system tracks the lights from the LEDs 167-1, -2, -3, -4 in order to identify the position of the user's head. The user's head may be reproduced in the visual display for the user, other users, and attendant. In an example, the user's head is recreated in the simulated environment to make a video or other type of recording to be replayed for the user at a later time.

At least one or more status LEDs 181-1, -2, -3 may be used to indicate the status of the HMD 164. In an example, the status LED shines red to indicate to the operator that the user is finished with a flight sequence or other experience. The operator can then lower the user safely down or help the user with removing the suit system 500. The status LED may be based on what is being displayed to the user 104, but it could also be based on other factors, such as the user response to the environment, time, machine response, or other factor, or a plurality of factors.

Connected to the HMD 164 may be a power cable, such as power cable 142 shown. Other types of power, including battery or other type of power is also anticipated.

In other examples, the HMD 164 includes EEG electrodes for obtaining EEG brain waves (e.g., located behind the ear, at the same location as sensor 170, same locations as tightening valves 171-1, -2, etc.). In further examples, the HMD 164 includes a gearing system 132 or other device for creating a haptic vibration effect in the helmet. Other sensory devices and simulation effect devices are also anticipated. Also note that a tracking device may be present in the HMD 164 that tracks at least one of hand movement and leg movement or other lower body landmarks or references.

The HMD 164 may further include at least one inertial measurement unit (IMU), an electronic device that measures and reports a body's specific force, angular rate, and sometimes the orientation of the body, using a combination of accelerometers, gyroscopes, and sometimes magnetometers.

Objects Used with the Marionette Assembly

Figure 10:
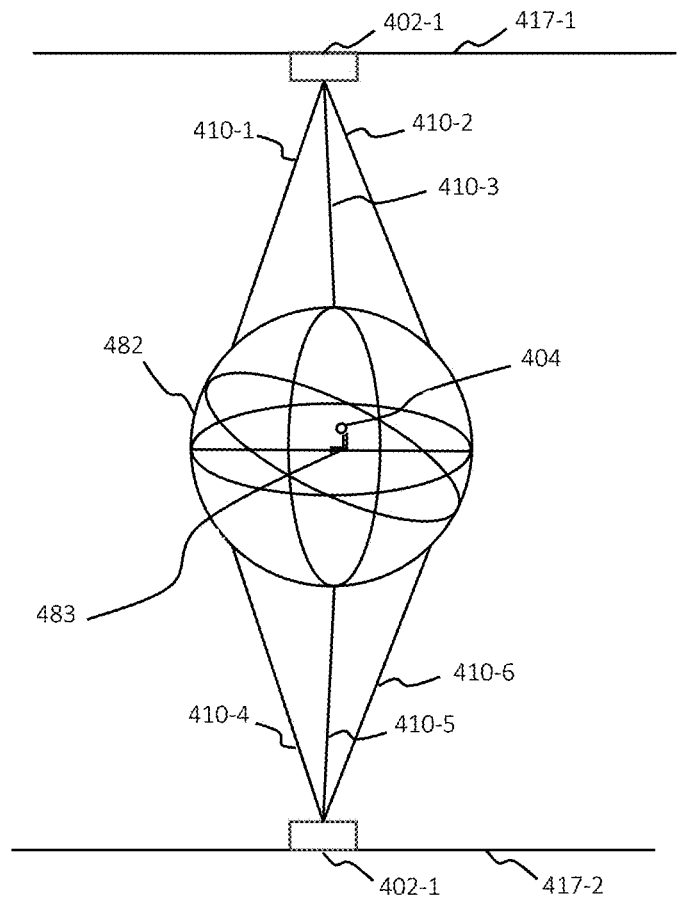
FIG. 10 illustrates a side view of a motion control system, according to an example of the principles described herein.

Further examples include that a marionette assembly be used with an object. Turning to FIG. 10, an orb 482 is shown that includes multiple rings, such as the four rings shown. The rings may be circular or oval or a combination thereof. In an example, four circular rings are for the cables to attach while the other rings are used to orient the user in space. The rings may be perpendicular to each other or have other orientations relative to each other. The rings are attached together. Centrally located within the orb is seat 483 that a user 404 may be attached to with a seatbelt or other locking structure.

A motion control system may be used to suspend and move the orb 382 in a simulated environment, with or without a suitable harness attached to the orb 482. In the example shown, the motion control system is represented by a suspension structure 417-1 above and a suspension structure 417-2 below the orb 482. The suspension structures 417-1, -2 may include at least one track according to principles described herein. A housing 402-1, -2 at respective top and bottom of the suspension structures 417-1, -2 moves the orb 482, the bottom housing 402-1 providing tension to prevent the orb 382 from unnecessary movement, such as swinging or gyration. Cables 410-1, -2, -3, -4, -5, -6 attach to the orb 482 around a ring at equally spaced intervals. Other attachments to the orb 482, such as the cables 410-1, -2, -3, -4, -5, -6 attached at unequally spaced intervals on one ring or attached to multiple rings is anticipated.

Other components may be used according to principles described herein. A variation of an IMU that is attached to the orb or the user within the orb may also be used to collect force, angular rate, and orientation. Also, the user 404 may still don a suit system and HMD or other device to have the simulation effects and experience the simulated environment according to principles described herein.

Figure 11:
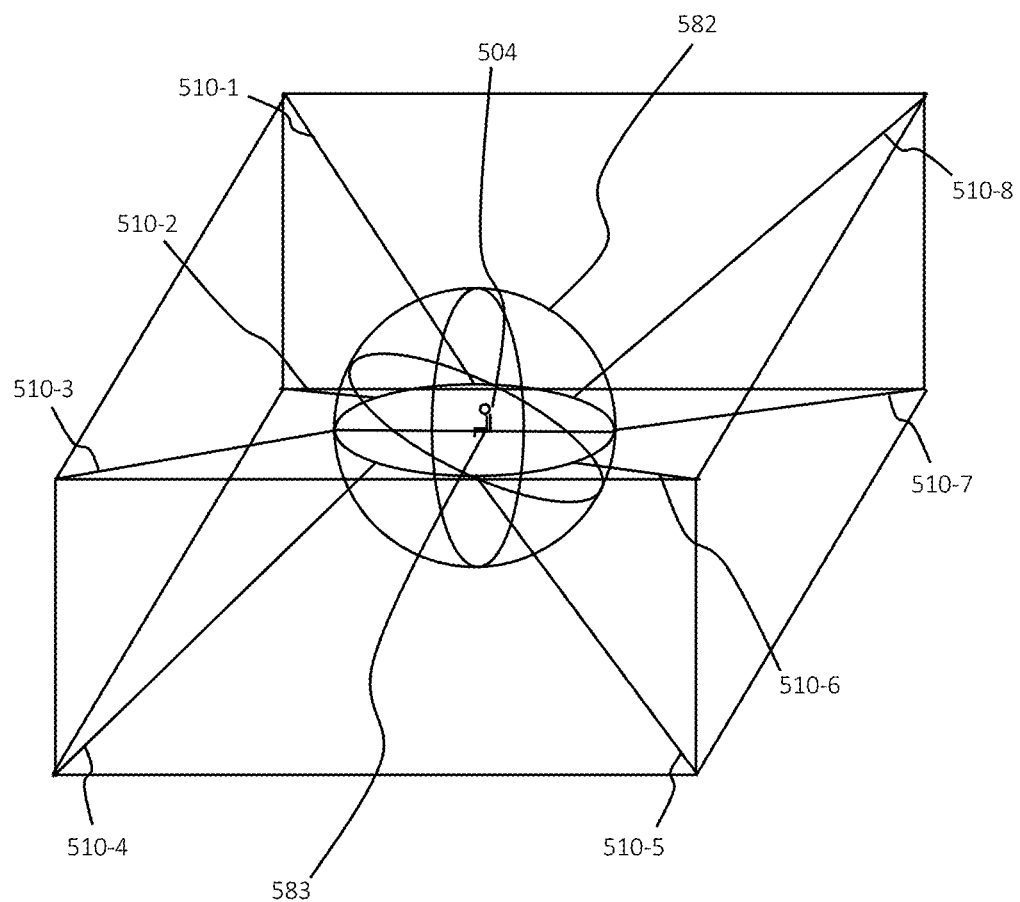
FIG. 11 illustrates a perspective view of a motion control system, according to an example of the principles described herein.

Turning to FIG. 11, another example of an object being suspended is shown. The orb 482 is suspended to corners of an enclosed area, such as a room. Cables 401-1, -2, -3, -4, -5, -6, -7, -8 are attached to equally spaced apart points around a ring of the orb 482 at one end and attached to corners of a room at the other end. The user 404 is contained with the orb 482 and attached to a seat 483 by a locking structure. The pulling in and letting out of the cables 401-1, -2, -3, -4, -5, -6, -7, -8 allows the orb 482 to move within the environment. The movement may be gyroscopic in nature.

In an example, the user 404 is placed in a large room using wire ropes for cables, the orb 482. A harness according to principles described here may be used to attach the cables to the orb 482. A controller is used to control the wire ropes to move the orb 482 through 3-D space and orient the user 404 relation to a ground surface. At least one sensor is used to identify the positioning of the user 404 or orb 482 within the space and relative to the ground. The user 404 may don an HMD to provide visual and auditory input. The user 404 may also don a suit system to provide haptic input to the controller. Simulation effects may include, for example, atmospheric generators to control airflow, temperature, and other atmospheric conditions as discussed herein or known in the art. The orb 482, controller, sensor, HMD, suit system, and simulation effects may be connected to a computing server on which resides a simulated environment generating software program. Using inputs from at least one of the sensors, HMD, controller, and other devices, the software program instructs the server to control the position or movement of the orb 482, controller, features of the HMD, suit system and simulation effects to provide the user 404 with the virtual ability to interact with objects within the flight space. At least one input may be used to counterbalance a sensation caused by re-positioning the orb 482. Thus, a simulated environment may maintain the feeling of a real environment.

With little or no other physical stimulation, users may be relatively sensitive to acceleration. Overstimulation (e.g., sensory inputs from multiple sensation-generating sources, etc.), however, may make it challenging to differentiate between the sources of stimulation. The sensations may blend together. This principle may be used to re-orient a user within a room. In an example, if a user gets too close to a wall, the user is provided with sensations that have allow the user to "impact" a virtual object, which impact causes haptic feedback (e.g., vibration, etc). In other examples, the movement caused by the vibration is used to move the user back to the center of the room. Furthermore, instead of physical stimulation, the use of visual and auditory stimulation may be used to counteract a re-orientation of a user backwards. Also, airflow, moisture, sound, and other sensory information may be used to provide a significant impact on sensations of speed and acceleration of the user within the room or other environment.

Control of Walking to Flight to Landing Process

Figure 12:
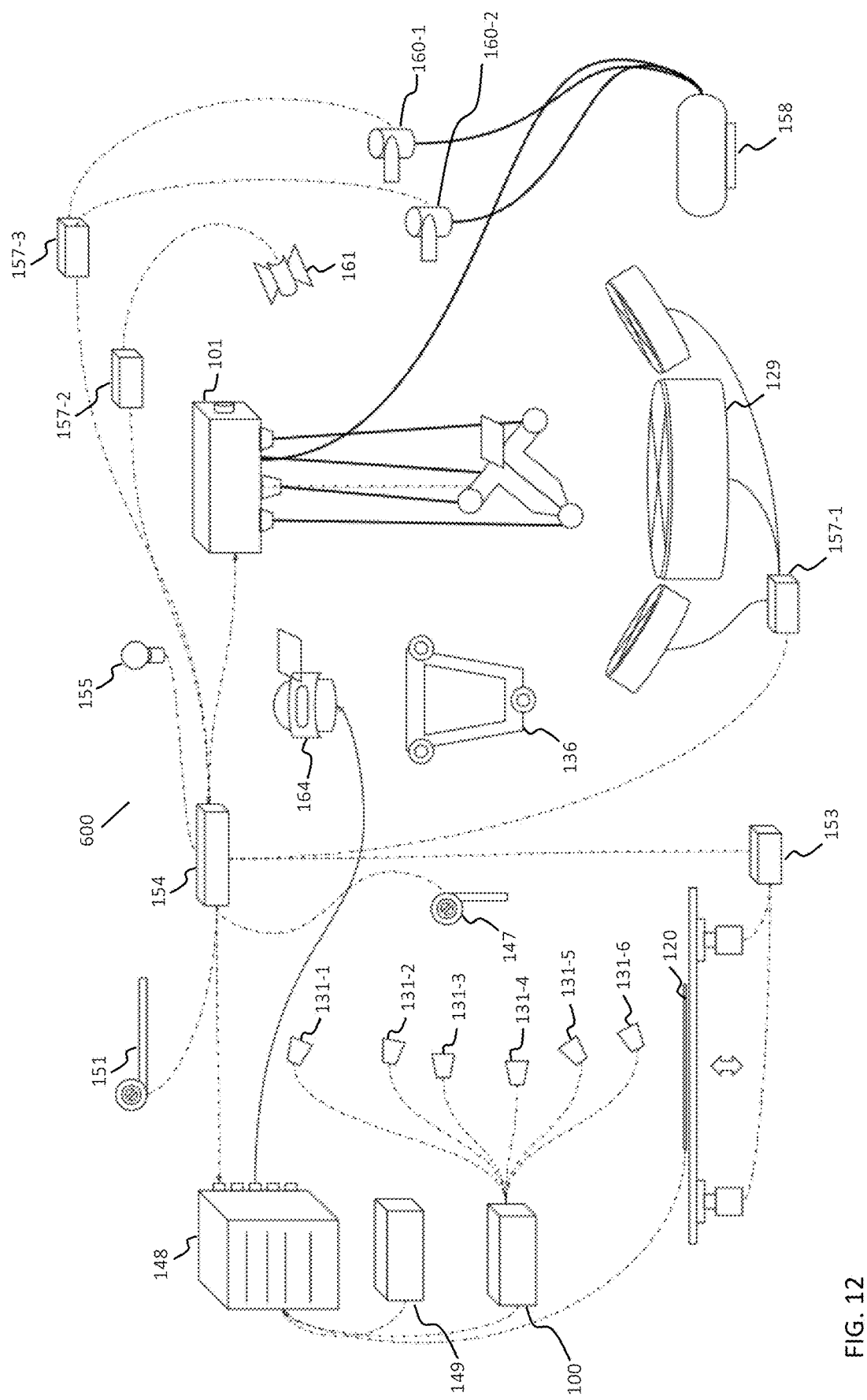
FIG. 12 illustrates a flow diagram for providing a simulated experience and simulated environment, according to an example of the principles described herein.

FIG. 12 illustrates an example flow diagram 600 for control and flow of information in the simulated environment. The exemplary components shown include at least one server 148; network switch 149; motion tracking system 130; tracking devices 131-1, -2, -3, -4, -5, -6; ceiling retractor 151; wall retractor 147; floor scale 120; floor lift controller 153; navigation controller 154; status light 155; HMD 164; back attachment 136; marionette assembly 101; simulation effects 129; dmx switches 157-1, -2, -3; scent delivery system 161; air blowers 160-1, -2; and compressed air device 158. Other components and features, including other components and features described herein may also be controlled according to principles discussed herein. Solid and gray lines indicate a direct physical connection (e.g., high definition multimedia interface (HDMI), universal serial bus (USB), power cable, etc.) between two devices. Dotted lines indicate the transfer of data or other type of transfer or connection.

An example process that uses the various components from walking to flight to landing is now described. The user 106 with the help of an attendant 105 slips into a suit system 500. The user 106 clips or otherwise removably locks into a harness 135 (see FIG. 4b), which may be similar to a typical parachute harness, on or already be within the suit system 500. Once secure, the attendant 105 guides the user 106 into the preparation area 124.

In the preparation area 124, the user 106 stands on a floor scale 120. The attendant 105 helps the user 106 place the HMD 164 (see FIG. 10) on the user's head, adjusting the visual display 180 and other features to the user's preference.

The attendant 105 then starts the simulation with a network switch 149 or signals to a control attendant to start the simulation. The weight of the user 106 is sent to the server 148. The server 148 applies the weight to the navigation controller 114 for calibrating the suspension structure 117 to the user's 106 weight and controlling simulation effect settings, such as air blower 160-1, -2 settings. Additional sensors or other devices may be used to gather height, biomechanics measurements, biometrics, etc. to be given to the server and applied through the navigation controller 154.

The HMD 164 may be used to provide the user with information about the experience. This could be, for example, a 90 second introduction video or audio recording about the flight or fall experience. An internal or external speaker and display screen may also be used.

The marionette assembly 101 is then attached to the back attachment 136. The attendant 105 receives the connective panel 115 as it is dropped or lowered from an opening of the room as the navigation controller 154 directs the ceiling retractor 151 to retract the ceiling. The attendant 105 attaches the connective panel 115 to the back attachment 136 of the body suit 133. Once attached, the user 106 the navigation controller 154 directs the floor lift controller 153 to move the movable floor 128. For example, the movable floor 128 may begin to rise to a jump height or other desired height above the ground. As the movable floor 128 rises, the navigation controller directs the wall retractor 147 to retractable wall 122 in front of the user lowers to the jump height or other desired height above the ground. Within less then 3 minutes, and as low as 90 seconds or less, the room completely transforms to reveal the simulation effects area 126.

The user 106 is free to move toward the jump edge. The user 106 sees and feels the simulated environment as the user 106 walks to the edge. As the user 106 moves within the space, the marionette assembly 101 moves with the user based on the motion capture data that is received by at least one of the server 148 and navigation controller 154. This is accomplished by the navigation controller causing at least one of the housing 102, and first 118 and second track 119, rotary component 106, and winches 108-1, -2, -3 with cables 110-1, -2, -3 to move.

The motion capture system 101, motion tracking system 130, and various other components may continually send positional and transformation data from the suit system 132, the back attachment 136, HMD 164 to at least one of the server 148 or navigation controller 154. The suspension structure 117 may also include a suspension controller that moves at least one of the housing 102, and first 118 and second track 119, rotary component 106, and winches 108-1, -2, -3 with cables 110-1, -2, -3 to move.

The data allows the navigation controller 154 to match the moves of the user. For example, if the user 106 moves forward, the navigation controller 154 may cause the housing 102 to move the same forward distance as the user 106, thus mimicking the user's distance.

As the user 106 completes walking to the edge, dmx switches 157-3 may be turned on and off by the navigation controller 154 to cause the scent delivery system 161 to deliver smells that match the simulated environment. The compressed air device 158 may also be turned on to cause air blowers 160-1, -2 to deliver air flow for light wind effects. For example, the user may feel like they are on top of a mountain, smell fresh air and light breezes normally associated with the top of a mountain as the user walks to a cliff edge on the mountain.

Following the introduction and any further training, the user 106 bends their legs and starts to lean out to take a jump. The navigation controller 154 anticipates this movement from at least one of the tracking data and data from accelerometers located in the connective panel 115. The motion tracking system 130 includes various tracking devices 131-1, -2, -3, -4, -5, -6 that are strategically placed around the simulation environment to track the user's movement and may involve cameras or other tracking devices. In example, at least one of the tracking devices 131-1, -2, -3, -4, -5, -6 captures images, video or tracks an LED light, marker, other visible location on or about the user. Data is also received by the navigation controller 154 with regards to the HMD 164 features described herein.

Based on the data collected, the navigation controller 154 prepares winches 108-1, -2, -3 to engage one or more dampening effects as the user 106 starts to fall. With the navigation controller 154 synchronized with the motion control system 100 and the simulation effects 129, the simulation effects 129, such as high speed fans, are made to increase or decrease their speed at the appropriate times.

At least one status light 155 is used to indicate the status of the user experience, for example, green to indicate that the user is in the experience, yellow to indicate the user is nearing completion of the experience, and red to indicate that the user is finished with the experience. Other indicators may be used as well.

Figure 13:
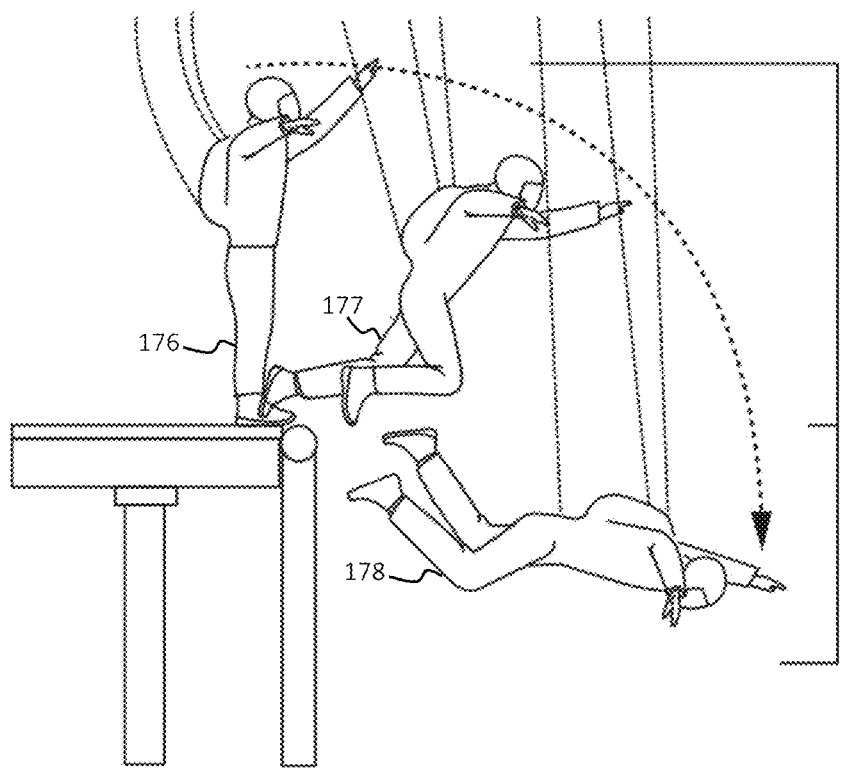
FIG. 13 illustrates a user having a simulated experience in a simulated environment with preparation, take-off, and flight, according to an example of the principles described herein.
Figure 14:
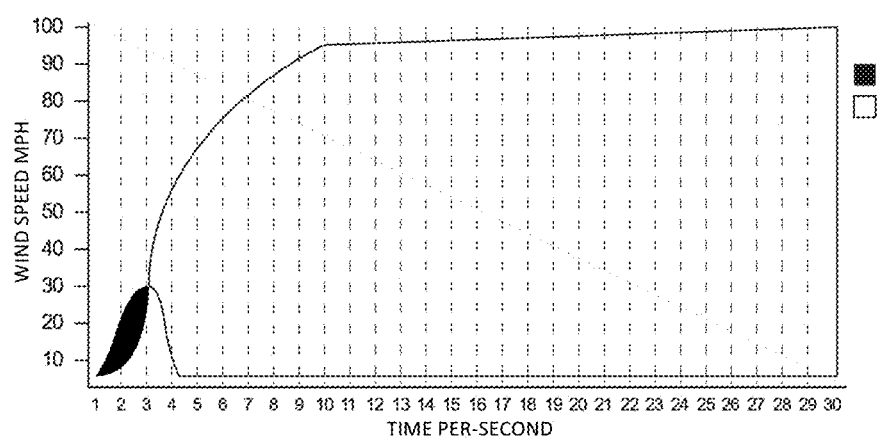
FIG. 14 illustrates a graphical overlay representation of wind speed of a fall with damping versus time per-second and fan speed versus time per-second according to an example of the principles described herein.

FIGS. 13 and 14 illustrate a fall or flight experience in which the user experiences a 9 to 10 foot drop. FIG. 13 shows three stages of the user, including standing, take-off jumping, and the full extension of falling. The suspension dampening effect may include, as shown, a 30% suspension of the user between 5.5 to 6.5 feet which corresponds to approximately 9 to 10 feet of perceived vertical fall to the user. Between 3-4 feet, there may be a 100% suspension. Other suspension percentages and drops are anticipated.

FIG. 14 illustrates wind speed in miles per hour (mph) versus time per second. The lighter shaded region reflects fan speed having an exponential acceleration which levels out over time. The darker shaded region reflects the fall and dampening force experienced by the user over time.

At the full extension of the falling stage, the cables of the suspension structure are at or near a maximum length for the particular experience and the high speed fans reach a maximum speed. The user 106 feels the greatest virtual velocity of the experience. The combination of suspension dampening and the ramping up of the high-speed fans provides the illusion to the user that the user is still falling.

Flight Automation

Information collected may be used to anticipate future movement of the user and control future movement, as well as to provide effects to the user during the simulation experience. IMU's, tracking devices, sensors, and other devices provide information that is processed to predict future movement of the user.

Once the user has completed the jump and is in the final flight position, tracking data from the motion capture system and IMU's located on the HMD and panel flow to the server to update the HMD visuals and pass transformational data to the navigator controller. The motion suspension system receives real time commands for position, rotation and height adjustments for each winch from the navigator controller.

Real time predictive tracking algorithms are used to interpret subtle moves from the tracking markers on the suit, collected by the motion capture system and IMU data. This allows the system to loosen cables or perform other functions on other devices to allow the user capability to move arms and legs up, down, and side to side to control their flight direction or other movement.

The motion control system and environment has a set of governor scripts that can be adjusted for various levels, such as beginner and more advanced flight sensitivity.

While the environment is described with various human attendants, one or more of the acts associated with the human attendants are anticipated to be automated within the system. Data collected and sensor data, as well as other data, may be used to automate the system.

Users typically rely on multiple gesture hardware to interact within a virtual reality environment. For example, control devices that are maneuvered with hands are relied on to track hand movements of the user. A control device may further be used for head tracking and eye tracking. Multiple devices may be used to track different parts of the body. In this manner, full body tracking may be achieved for automating the experience as well as other purposes.

The motion tracking system can be within or above the preparation area and the simulation effects area. The motion capture may include pointing toward the user's physical location when the user is attached to the panel or other components of the system. Capture devices may run, for example at 205 hz or greater, feeding positional telemetry data back to the motion control system in real-time, allowing predictive tracking software algorithms to analyze the data and drive all of the motion controls system components accordingly.

Software Configuration

Computing systems described herein include a processor to perform various functions described herein and memory to store related data. Various machine-readable instructions may be executed by the processor. The modules can include general or special purpose hardware, firmware, or software embodied in a computer readable storage medium for execution by the processor. As used herein, a computer-readably medium or computer-readable storage medium includes hardware (e.g., registers, random access memory (RAM), and nonvolatile (NV) storage, etc.) and is represented by memory in the computing system. The processor and its various modules may be used to perform functions that are used to create the 3D models, track the movement of users, and render 3D models that perform the movements.

Figure 15:
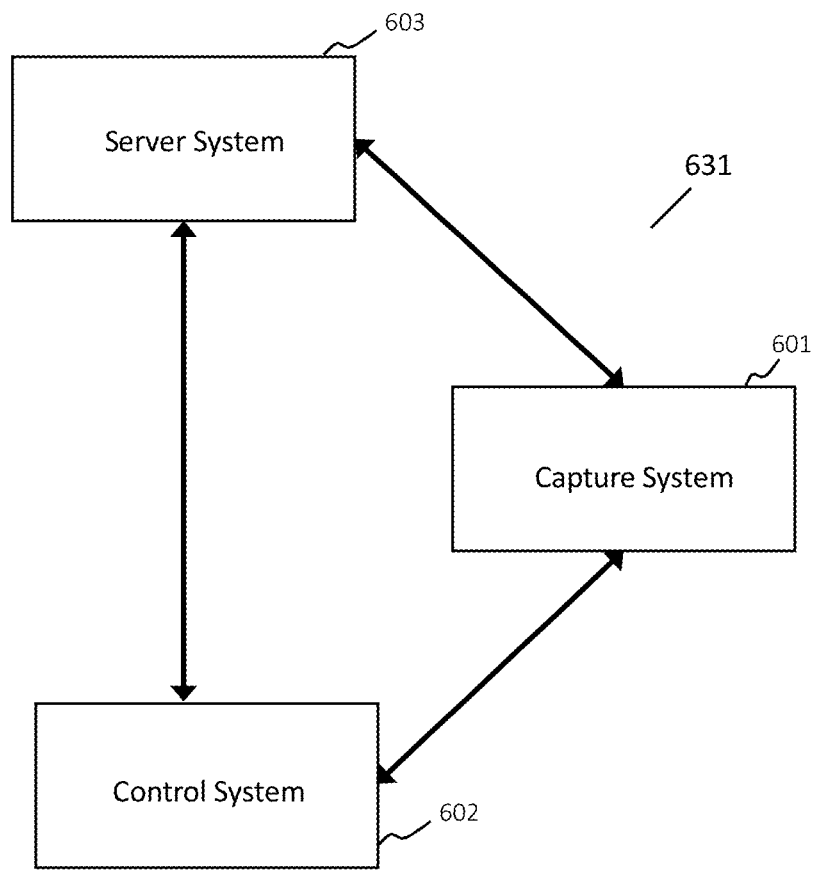
FIG. 15 illustrates a computing environment for a simulated experience and simulated environment, according to an example of the principles described herein.

FIG. 15 illustrates a simulation system 631 used to simulate environments and implement simulation principles discussed herein. The simulation system 631 includes a server system 603, capture system 601, and a control system 602. The server system 603 includes a non-transitory memory that stores instructions and a computer processor that executes the instructions to implement a simulated environment and associated simulation principles discussed herein. The capture system 601 includes various motion tracking devices, sensors, and other devices used to collect information about the user 106 and the environment to be sent to the server system 603 as directed by the server system 631. The control system 602 includes at least one navigation controller that is used to control various aspects of the user's position and bodily movement, simulation effects (e.g., air flow, scent delivery, sound effects, visual display, etc.) with data provided by the server system 603 or as directed by the server system 603. The control system 602 may further receive information from the capture system 601 and directs the information about the user 106 and the environment.

Figure 16:
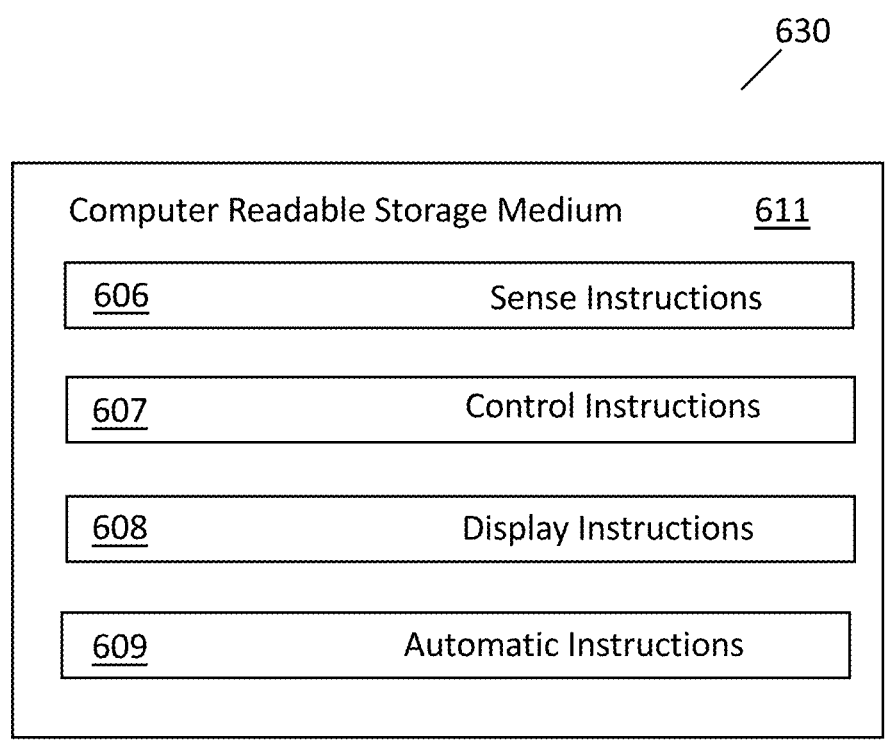
FIG. 16 illustrates a computer program product for providing a simulated experience and simulated environment, according to an example of the principles described herein.

FIG. 16 depicts a computer program product 630 with a computer readable storage medium 611 for implementing a simulated experience and simulated environment for a user 106, according to an example of principles described herein. To achieve its desired functionality, a computing system includes various hardware components. Specifically, a computing system includes a processor and a computer-readable storage medium 611. The computer readable storage medium 611 is communicatively coupled to the processor. The computer readable storage medium 611 includes a number of instructions 606, 607, 608, 609 for performing a designated function. The computer-readable storage medium 611 causes the processor to execute the designated function of the instructions 606, 607, 608, 609.

Referring to FIG. 16, sense instructions 606, when executed by the processor 617, may cause the processor 617 to obtain sensory information, including position and movement of the user 106, etc., by the various sensors and tracking devices, according to principles discussed herein. Control instructions 607, when executed by the processor, may cause the processor to control and actuate various devices, such as movement of the housing 102, movement of the cables 110-1, -2, -3, -4, air inflation of the suit system 500, activation of the simulation effects (e.g., high speed fans, sound effects, etc.), as well as other control and actuation of various devices described herein. Display instructions 608, when executed by the processor, may cause the visual display 180 within the HMD 164 to display a specific simulated environment to the user 106. Automatic instructions 609, when executed by the processor, may cause certain devices described herein to automatically be turned on or off or perform a function. For example, the marionette assembly may move a user that appears to be trying to move forward actually move forward in the direction that the user is trying to go. When cameras or other tracking devices sense that a user's feet are on the ground, the suit system 500 may automatically unlock. Other examples are anticipated.

Figure 17:
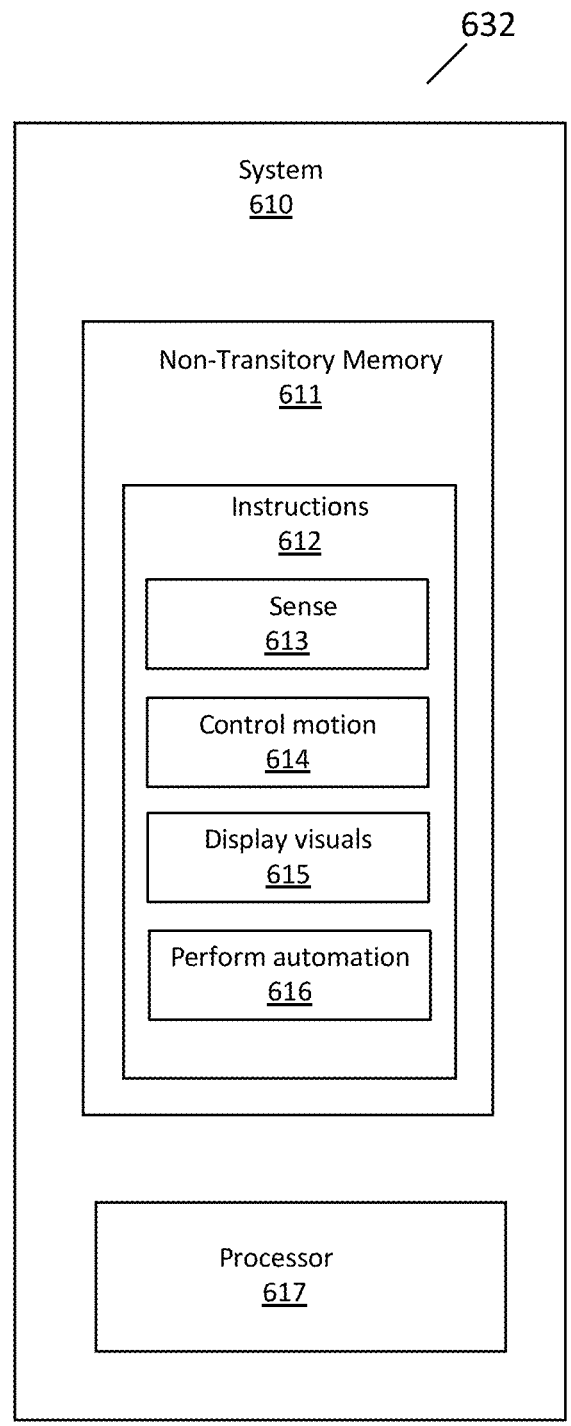
FIG. 17 illustrates a system for providing a simulated experience and simulated environment, according to an example of the principles described herein.

It is also contemplated that principles discussed herein be accomplished through a system. Turning to FIG. 17, a block diagram 632 of a system 610 includes a non-transitory memory 611 that stores instructions 612 and a processor 617 that executes the instructions 612 to implement a simulated experience and simulated environment according to principles discussed herein. The instructions listed include Sense motion 613, Control motion 614, Display visuals 615, and Perform automation 616.

Sense motion 613, when executed by the processor 617, may cause the processor 617 to obtain sensory information, including position and movement of the user 106, etc., by the various sensors and tracking devices, according to principles discussed herein. Sense motion 613 may further include obtaining other sensory information, such as information about the various devices or about the environment. Control motion 614, when executed by the processor, may cause the processor to control and actuate various devices, such as movement of the housing 102, movement of the cables 110-1, -2, -3, -4, air inflation of the suit system 500, activation of the simulation effects (e.g., high speed fans, sound effects, etc.), as well as other control and actuation of various devices described herein. Display visuals 615, when executed by the processor, may cause the visual display 180 within the HMD 164 to display a specific simulated environment to the user 106. Perform automation 616, when executed by the processor, may cause certain devices described herein to automatically be turned on or off or perform a function as noted above.

Figure 18:
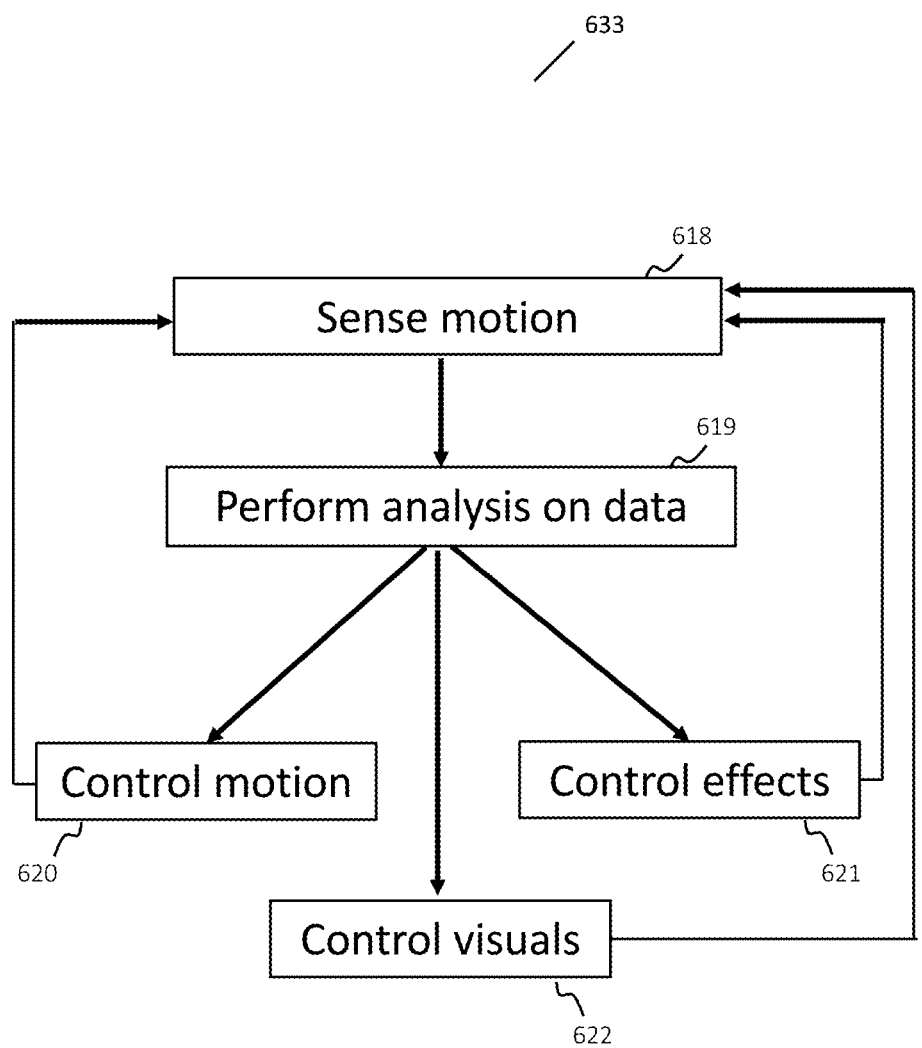
FIG. 18 illustrates a flowchart of a method for providing a simulated experience and simulated environment, according to an example of the principles described herein.

FIG. 18, illustrates a flowchart 633 for anticipating and controlling movement as implemented in a simulated experience and simulated environment according to principles discussed herein and will be discussed as it relates to elements discussed herein. A motion by the user is sensed and data from the motion is collected and analyzed. Based on algorithms for predicting futuristic behavior and automating processes, devices can be activated and controlled and motion can be controlled and enhanced. In an example, simulation effects and visuals can be controlled and enhanced based on the algorithms.

At block 618, motion is sensed by a motion tracking system 130 and data is obtained that is sent to the server 148 or the navigation controller 154. At block 619, the server 148 performs analysis on the data and an appropriate action is determined. Data collected based on the controls for motion and effects is fed back to the server 148 to provide feedback on the control and provide future analysis to start the process again. For example, at block 620, the motion may be controlled. At block 622, the visuals can be controlled. And, at block 621, the simulation effects can be controlled. Note that the control can be automated as described herein. The various motion, visuals, and effects will provide data once again to the motion tracking system 130 and the process will repeat.

In a specific example, motion by the user is sensed and data from the motion is collected and analyzed. Algorithms used are designed to make the motion capture system and simulated environment become a smooth and streamlined process. Predictive behavior analysis is used to have devices act in a manner consistent with previous movements of the user or other users of similar size or other similar characteristic. Effects and visuals may also be controlled based on predictive analysis. The data collected based on the controls for motion and effects is fed back to the server to provide feedback on the control and provide future analysis to start the process again.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A motion control system comprising:
a suspension structure;
a marionette assembly comprising:
a housing slidably engaged to the suspension structure such that the housing translates in a planar manner relative to the suspension structure;
a rotary component rotatably attached to the housing, such that the rotary component rotates around an axis of the housing;
a plurality of winches with cables, the plurality of winches attached to the rotary component to allow movement of the cables;
a dampening mechanism through which the cables pass, the dampening mechanism to dampen or completely halt the movement of the cables; and
a navigation controller to control the movement of the housing, rotary component, the plurality of winches with cables, the dampening mechanism to provide a controlled movement of the marionette assembly, wherein the rotary component includes three winches located at corners of a triangular shape.

2. A motion control system comprising:
a suspension structure;
a marionette assembly comprising:
a housing slidably engaged to the suspension structure such that the housing translates in a planar manner relative to the suspension structure;

a rotary component rotatably attached to the housing, such that the rotary component rotates around an axis of the housing;
a plurality of winches with cables, the plurality of winches attached to the rotary component to allow movement of the cables;
a dampening mechanism through which the cables pass, the dampening mechanism to dampen or completely halt the movement of the cables; and
a navigation controller to control the movement of the housing, rotary component, the plurality of winches with cables, the dampening mechanism to provide a controlled movement of the marionette assembly, wherein the motion control system further comprises a connective panel that attaches to ends of the cables, the connective panel to attach to a user's body, the connective panel including at least one of an accelerometer, gyroscope, and magnetometer to determine information from at least one of a specific force, angular rate, and orientation of the user's body.

3. The motion control system of claim 2 wherein the connective panel further includes a 3-dimensional positional sensor.

4. The motion control system of claim 2 wherein the connective panel further includes a 3-dimensional marker.

5. The motion control system of claim 2, wherein the information is sent to the navigation controller to be used to control at least one of the housing, the rotary component, the plurality of winches with cables, and the dampening mechanism.

6. The motion control system of claim 3, wherein the information is sent to the navigation controller to be used to control at least one of the housing, the rotary component, the plurality of winches with cables, and the dampening mechanism.

7. The motion control system of claim 4, wherein the information is sent to the navigation controller to be used to control at least one of the housing, the rotary component, the plurality of winches with cables, and the dampening mechanism.

8. A motion control system comprising:
a suspension structure;
a marionette assembly slidably engaged to the suspension structure such that translational movement of the marionette assembly is possible in at least two dimensions, the marionette assembly including cables that are to suspend a user or object, the cables to move and rotate relative to the marionette assembly and thereby provide three-dimensional movement and rotation of the user or object relative to the suspension structure;
a harness that is attached to the user or object to facilitate attachment of the cables to the user or object, the harness to collect positional data of the user or object;
a navigation controller to control at least one of the movement of the marionette assembly and cables to control movement of the user or object, the navigation controller to receive the positional data from the harness and thereby determine predictive movement of the user or object and control future movement, wherein the object is a spherical orb in which a user is supported.

9. A motion control system comprising:
a suspension structure;
a marionette assembly comprising:
a housing slidably engaged to the suspension structure such that the housing translates in a planar manner relative to the suspension structure,
a rotary component rotatably attached to the housing, such that the rotary component rotates around an axis of the housing;
a plurality of winches with cables, the plurality of winches attached to the rotary component to allow movement of the cables;
a dampening mechanism through which the cables pass, the dampening mechanism to dampen or completely halt the movement of the cables; and
a navigation controller to control the movement of the housing, rotary component, the plurality of winches with cables, the dampening mechanism to provide a controlled movement of the marionette assembly;
the motion control system further comprising a head-mounted display to be worn by a user and configured to display visuals related to at least one of a virtual environment and motion simulation within the virtual environment, as provided by the navigation controller;
the motion control system further comprising a suit system to be worn by a user, the harness to be attached to the suit system;
the motion control system further comprising a connective panel that attaches to the harness, the connective panel to align with the harness via at least one physical structure, the suit system to be inflated through an air line on the connective panel when the connective panel is attached to the harness.

10. A motion control system comprising:
a suspension structure;
a marionette assembly comprising:
a housing slidably engaged to the suspension structure such that the housing translates in a planar manner relative to the suspension structure,
a rotary component rotatably attached to the housing, such that the rotary component rotates around an axis of the housing;
a plurality of winches with cables, the plurality of winches attached to the rotary component to allow movement of the cables;
a dampening mechanism through which the cables pass, the dampening mechanism to dampen or completely halt the movement of the cables; and
a navigation controller to control the movement of the housing, rotary component, the plurality of winches with cables, the dampening mechanism to provide a controlled movement of the marionette assembly;
the motion control system further comprising a head-mounted display to be worn by a user and configured to display visuals related to at least one of a virtual environment and motion simulation within the virtual environment, as provided by the navigation controller;
the motion control system further comprising a head mounted display that to be worn by a user, the head mounted display comprising at least one of an air inlet to allow air flow within the head mounted display, an LED light for positional tracking, an electroencephalogram (EEG) sensor for tracking heart rate, a camera for tracking eye movement, a sensor to contact a skin surface to obtain at least one of perspiration and skin density data.

11. A motion control system comprising:
a suspension structure;
a marionette assembly comprising:

a housing slidably engaged to the suspension structure such that the housing translates in a planar manner relative to the suspension structure, a rotary component rotatably attached to the housing, such that the rotary component rotates around an axis of the housing;

a plurality of winches with cables, the plurality of winches attached to the rotary component to allow movement of the cables;

a dampening mechanism through which the cables pass, the dampening mechanism to dampen or completely halt the movement of the cables; and a navigation controller to control the movement of the housing, rotary component, the plurality of winches with cables, the dampening mechanism to provide a controlled movement of the marionette assembly;

the motion control system further comprising a head-mounted display to be worn by a user and configured to display visuals related to at least one of a virtual environment and motion simulation within the virtual environment, as provided by the navigation controller;

the head mounted display further comprising at least one or more removable inserts that can be cleaned in between uses.

12. A motion control system comprising:

a marionette assembly comprising:

a movable housing;

a rotary component rotatably attached to the housing such that the rotary component rotates around an axis of the housing;

a plurality of winches with cables, the plurality of winches attached to the rotary component to allow movement of the cables;

a dampening mechanism to which the cables are functionally connected, the dampening mechanism to dampen or completely halt the movement of the cables;

a controller to control the movement of the housing, rotary component, the plurality of winches with cables, and the dampening mechanism to provide a controlled movement of the marionette assembly;

a harness that is worn by a user or attached to an object to facilitate attachment of the cables to the user or object, the harness to collect positional data of the user or object, the controller to receive the positional data from the harness to obtain predictive movement of the user or object and control the movement;

the motion control system further comprising a movable floor upon which the user stands before simulated air motion begins, the floor translating in at least one of a horizontal, vertical, and angled direction to remove the floor from underneath the user.

13. A motion control system comprising:

a marionette assembly comprising:

a movable housing;

a rotary component rotatably attached to the housing such that the rotary component rotates around an axis of the housing;

a plurality of winches with cables, the plurality of winches attached to the rotary component to allow movement of the cables;

a dampening mechanism to which the cables are functionally connected, the dampening mechanism to dampen or completely halt the movement of the cables;

a controller to control the movement of the housing, rotary component, the plurality of winches with cables, and the dampening mechanism to provide a controlled movement of the marionette assembly;

a harness that is worn by a user or attached to an object to facilitate attachment of the cables to the user or object, the harness to collect positional data of the user or object, the controller to receive the positional data from the harness to obtain predictive movement of the user or object and control the movement;

the motion control system further comprising a movable floor upon which the user stands before simulated air motion begins, the floor translating in at least one of a horizontal, vertical, and angled direction to remove the floor from underneath the user;

the movable floor further comprising a floor scale that determines a weight of a user to calibrate one or more effects of a virtual environment and motion simulation within the virtual environment.

* * * * *

UNITED STATES PATENT AND TRADEMARK OFFICE
CERTIFICATE OF CORRECTION

| | |
|---|---|
| PATENT NO. | : 11,931,664 B2 |
| APPLICATION NO. | : 16/987364 |
| DATED | : March 19, 2024 |
| INVENTOR(S) | : James Jensen and W. Matthew Hall |

It is certified that error appears in the above-identified patent and that said Letters Patent is hereby corrected as shown below:

In the Claims

Column 25, Line 56 Claim 8, should read:
harness to collect positional data of the user or object;
and, Column 26, Line 3 Claim 9, should read:
relative to the suspension structure;

Column 26, Line 23-24 Claim 9, should read:
the motion control system further comprising a suit system
to be worn by a user; a harness to be attached to the suit system;

Signed and Sealed this
Fourteenth Day of May, 2024

Katherine Kelly Vidal
*Director of the United States Patent and Trademark Office*